(12) United States Patent
Nakamura et al.

(10) Patent No.: US 7,520,552 B2
(45) Date of Patent: Apr. 21, 2009

(54) CONSOLE BOX

(75) Inventors: Tatsuhiko Nakamura, Fuji (JP); Hajime Mochizuki, Fuji (JP); Kenichi Kamio, Fuji (JP)

(73) Assignee: Nihon Plast Co., Ltd., Fuji-Shi, Shizuoka-ken (JP)

( * ) Notice: Subject to any disclaimer, the term of this patent is extended or adjusted under 35 U.S.C. 154(b) by 349 days.

(21) Appl. No.: 11/374,015

(22) Filed: Mar. 14, 2006

(65) Prior Publication Data

US 2006/0208517 A1 Sep. 21, 2006

(30) Foreign Application Priority Data

Mar. 15, 2005 (JP) ............................. 2005-073708
Apr. 19, 2005 (JP) ............................. 2005-121029

(51) Int. Cl.
*B60R 7/04* (2006.01)
(52) U.S. Cl. ..................... 296/24.34; 296/37.15; 108/44
(58) Field of Classification Search .............. 296/24.34, 296/37.8, 37.15; 108/44, 45; 224/275, 283; 312/237, 270.1–270.3, 249.3, 298, 302, 303
See application file for complete search history.

(56) References Cited

U.S. PATENT DOCUMENTS

| 6,032,587 | A | * | 3/2000 | Salenbauch et al. ........... 108/44 |
|---|---|---|---|---|
| 6,273,310 | B1 | * | 8/2001 | Gregory ...................... 224/275 |
| 6,347,590 | B1 | * | 2/2002 | D'Annunzio et al. ......... 108/44 |
| 6,547,323 | B1 | * | 4/2003 | Aitken et al. ................. 297/113 |
| 6,736,438 | B1 | * | 5/2004 | Wieclawski ................. 296/24.3 |
| 2002/0066392 | A1 | * | 6/2002 | Calam et al. .................. 108/33 |
| 2002/0140246 | A1 | * | 10/2002 | Worrell et al. ............. 296/37.8 |
| 2002/0163215 | A1 | * | 11/2002 | Emerling et al. ........... 296/24.1 |
| 2004/0217615 | A1 | * | 11/2004 | Lindstrom et al. ....... 296/24.34 |
| 2005/0052044 | A1 | * | 3/2005 | Toyota et al. ............ 296/24.34 |
| 2006/0220425 | A1 | * | 10/2006 | Becker et al. .......... 297/188.16 |

FOREIGN PATENT DOCUMENTS

JP 2001-122030 5/2001

* cited by examiner

*Primary Examiner*—Jason S Morrow
(74) *Attorney, Agent, or Firm*—NDQ & M Watchstone LLP

(57) ABSTRACT

A console box has a table of a vehicle and disposed between a pair of seats for a passenger. The console box, includes: a box body having a receptor space; a lid configured to cover the receptor space of the box body, and a table configured to move between the followings: a) a first position where the box body is overlapped with the lid, and b) a second position disposed frontward relative to the first position with respect to the seats. The table includes: a) a shaft configured to support a plate face of the table such that the plate face is rotatable substantially horizontally, and b) a guide configured to move the table frontward through between the pair of the seats.

15 Claims, 26 Drawing Sheets

FIG.13
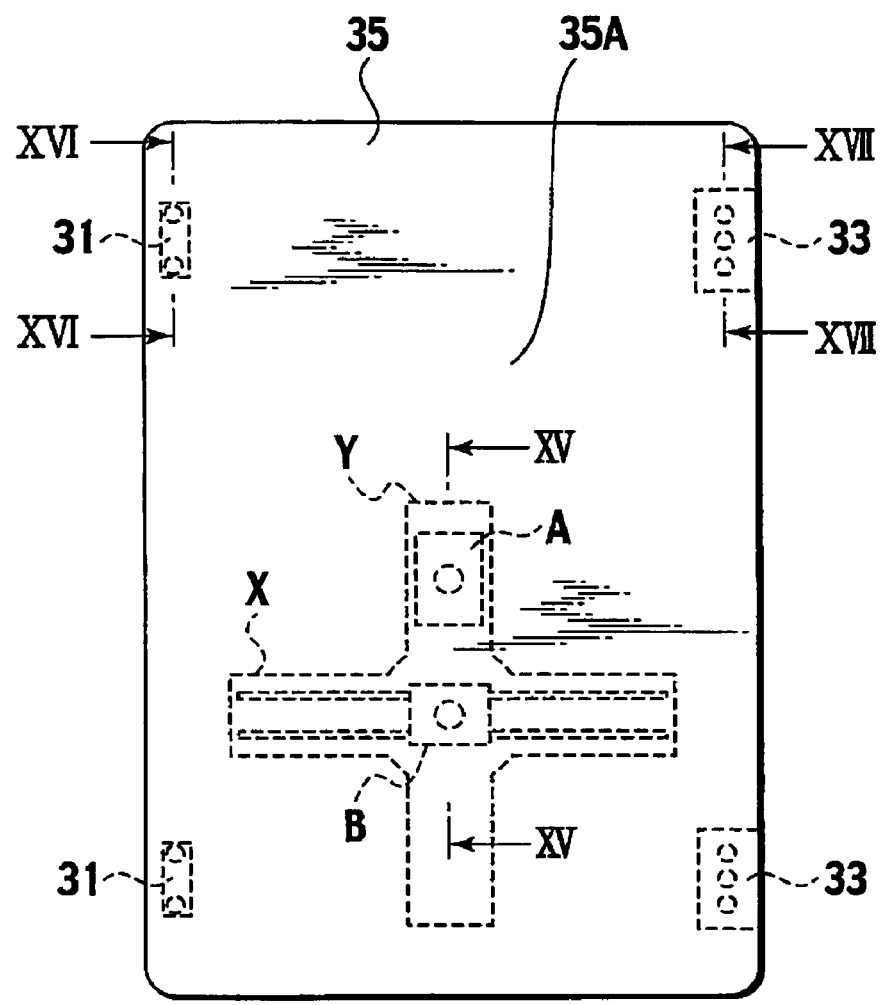
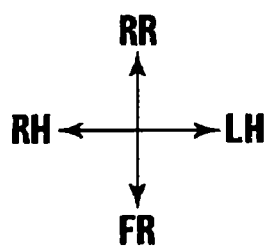

FIG.18
BASIC STATE
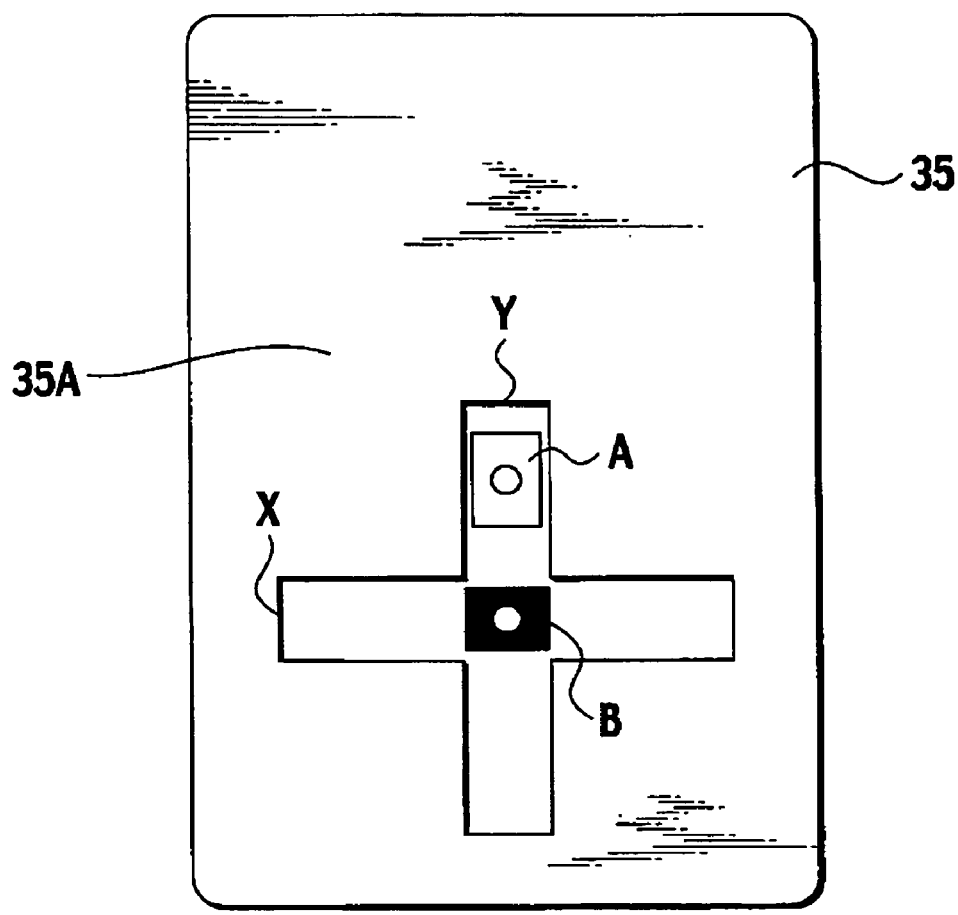
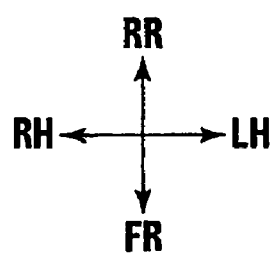

FIG.20
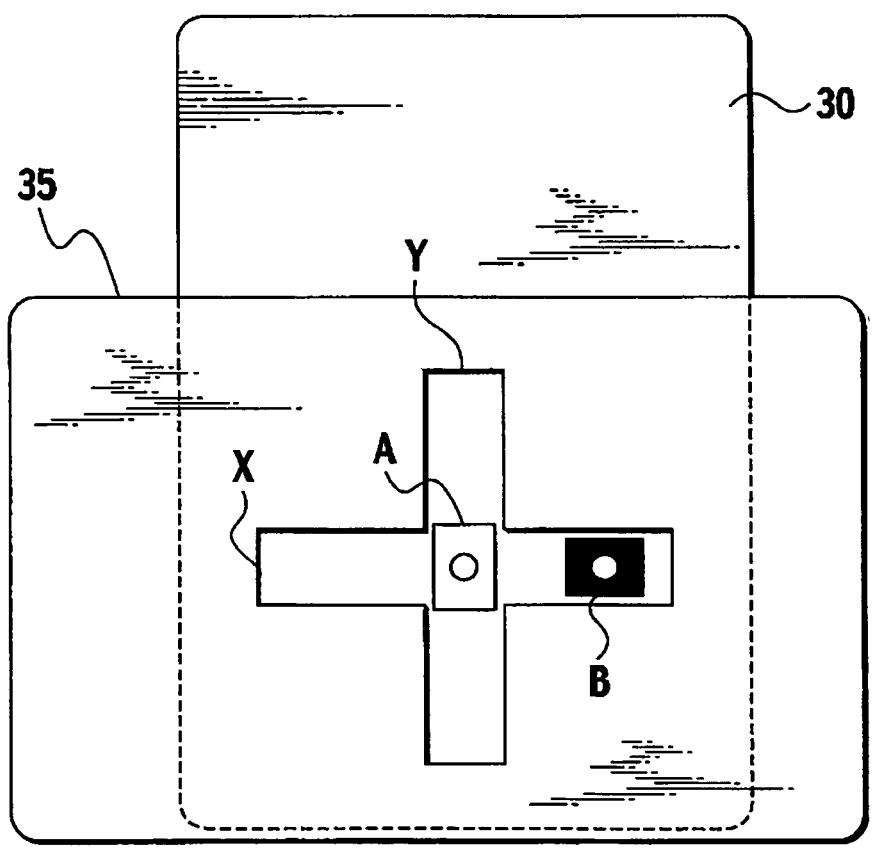
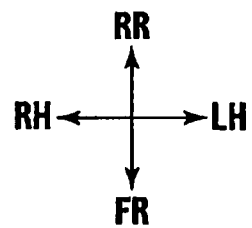

FIG.24
270° ROTATION
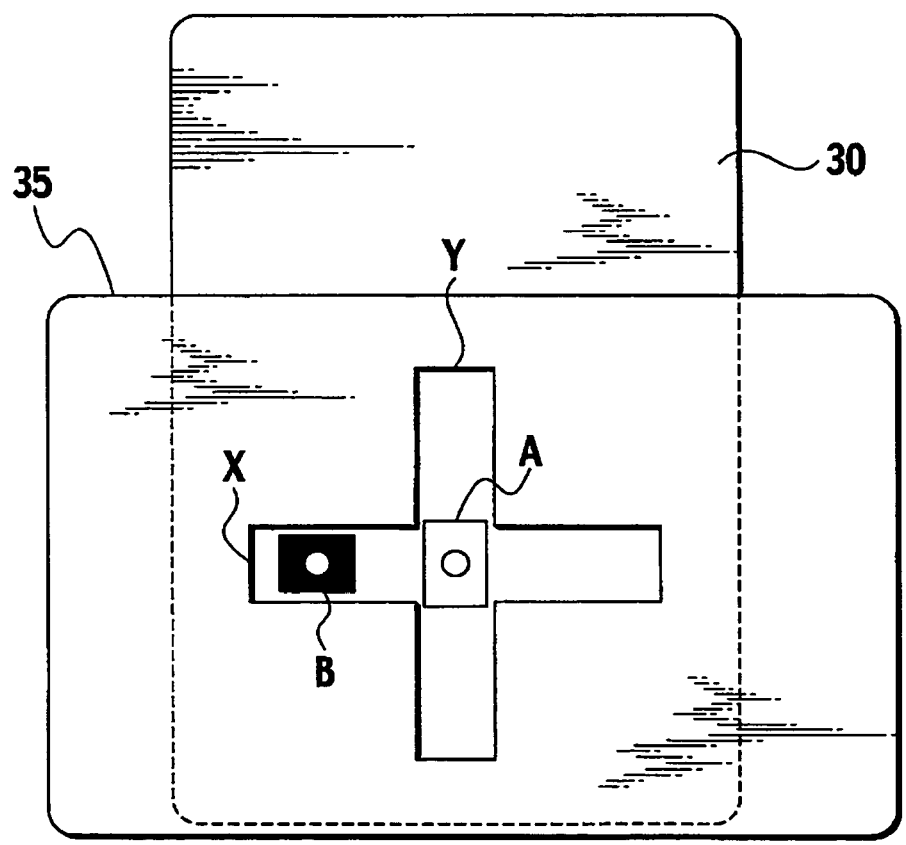
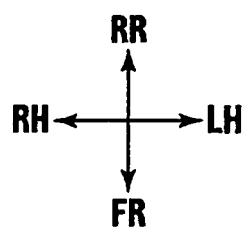

CONSOLE BOX

BACKGROUND OF THE INVENTION

1. Field of the Invention

The present invention relates to a console box.

2. Description of the Related Art

Japanese Patent Unexamined Publication No. 2001-122030 (JP2001122030) discloses a following console box (entitled multipurpose console 10 for vehicle): Between a left front seat 1 and a right front seat 1 in an automobile, there is provided an upper console box 15C for receiving an article (notebook computer PC in abstract of JP2001122030). The upper console box 15C has an upper part lidded by a lid 21 which is adapted to open and close. The upper console box 15C has a lower part provided with a table 15B which is rotatable in a horizontal direction about a vertical shaft 16 defined in a front end position. The table 15B has a lower part provided with a lower console box 15A. In sum, the table 15B is provided between the upper console box 15C and the lower console box 15A.

The table 15B is not positioned in the uppermost part but low. Therefore, when the table 15B is used, the upper console box 15C, the table 15B and the lower console box 15A in combination are to be raised by linking them. With the upper console box 15C, the table 15B and the lower console box 15A which are thus positioned high, the table 15B is rotated from the upper console box 15C and the lower console box 15A toward the left front seat 1 or the right front seat 1, thereby putting the article (drink or notebook computer PC) on the table 15B.

SUMMARY OF THE INVENTION

According to the above conventional technology, however, the table 15B is so structured as to rotate only in the horizontal direction about the vertical shaft 16. Thereby, when rotating the table 15B frontward (use-position) of the left front seat 1 or right front seat 1, an end part (opposite to the vertical shaft 16) of the table 15B may interfere with a seat occupant. Thereby, the seat occupant is forced to avoid his/her body for rotating the table 15B, resulting in an unpreferable operability.

In addition, for using the table 15B, the link is to be used for raising the upper console box 15C, the table 15B and the lower console box 15A, resulting in decreased rigidity of the multipurpose console 10 and increased vibration of the table 15B during driving of the automobile.

It is therefore an object of the present invention to provide a console box with which a seat occupant is free from an interference with the table in a process of moving to a use-position, increasing rigidity of the console box.

According to an aspect of the present invention, there is provided a console box having a table of a vehicle and disposed between a pair of seats for a passenger, the console box, comprising: 1) a box body having a receptor space; 2) a lid configured to cover the receptor space of the box body; and 3) a table configured to move between the followings: a) a first position where the box body is overlapped with the lid (5, 30, 44), and b) a second position disposed frontward relative to the first position with respect to the seats, the table including: a) a shaft configured to support a plate face of the table such that the plate face is rotatable substantially horizontally, and b) a guide configured to move the table frontward through between the pair of the seats.

The other object(s) and feature(s) of the present invention will become understood from the following description with reference to the accompanying drawings.

BRIEF DESCRIPTION OF THE DRAWINGS

FIG. 13 is a plan view of the table in FIG. 9 and FIG. 10.

FIG. 18 is a plan view of the table in the basic state.

FIG. 20 is a plan view of the table in a state of 90° rotation.

FIG. 24 is a plan view of the table in a state of 270° rotation.

DESCRIPTION OF THE PREFERRED EMBODIMENTS

Figure 1:
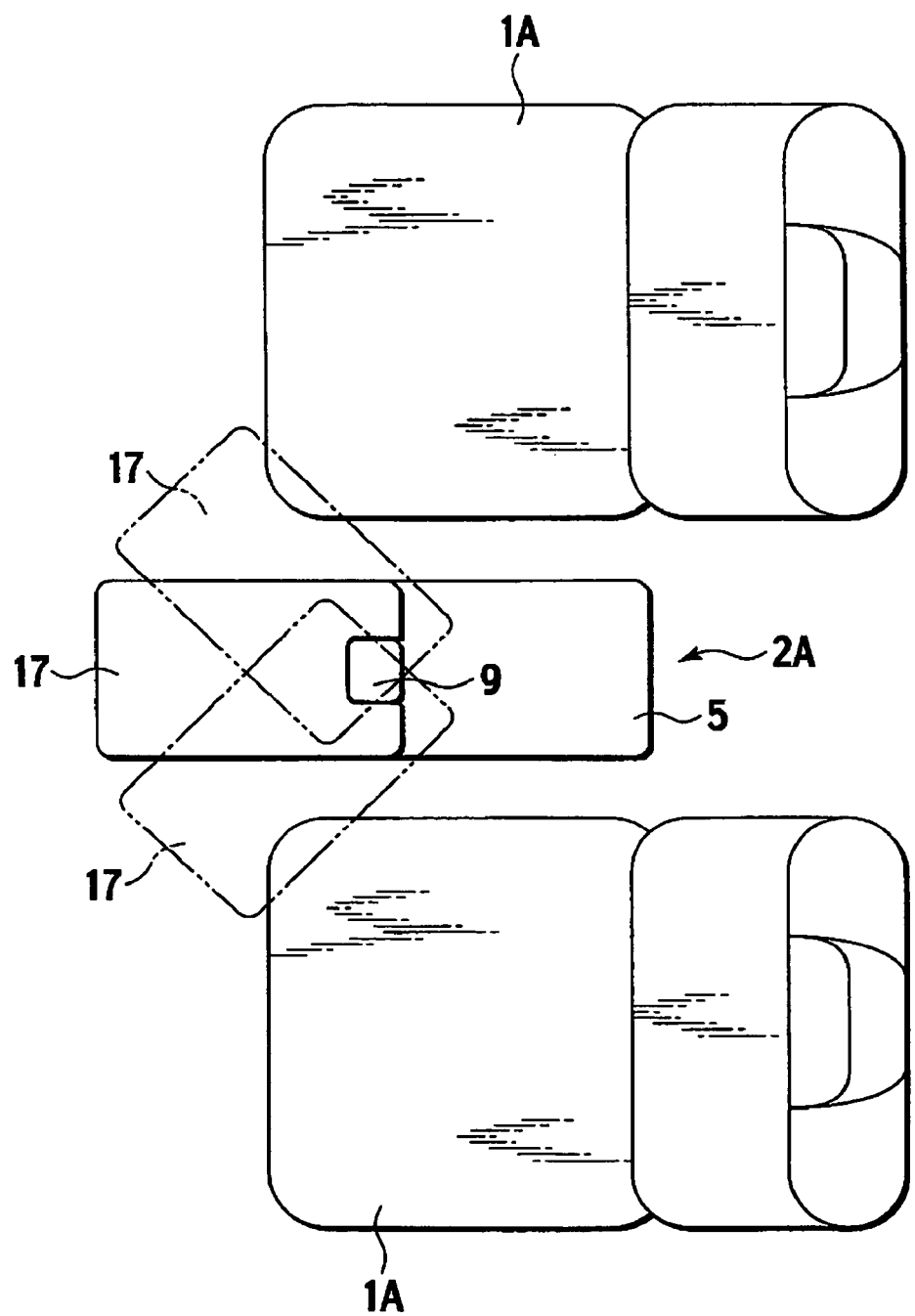
FIG. 1 is a plan view showing a console box, according to a first embodiment of the present invention.

For ease of understanding, the following description will contain various directional terms, such as left, right, upper, lower, forward, rearward and the like. However, such terms are to be understood with respect to only a drawing or drawings on which the corresponding part of element is illustrated.

First Embodiment

<Structure>

FIG. 1 to FIG. 7 show a console box 2A, according to a first embodiment of the present invention. Between a right front seat 1A and a left front seat 1A of an automobile, there is provided the console box 2A including a box body 2A-1 having a receptor space 60. The console box 2A is in a form of a vessel having an opening in an upper part thereof, and is disposed on an upper part of a floor tunnel (not shown) via a base 3A.

In the upper part of the console box 2A according to the first embodiment, there is provided a lid 5 opening and closing in a lateral direction about hinges 4 at a right end of the console box 2A. A striker 6 locks the lid 5 to the console box 2A, while pressing a button 7 opens the lid 5. The lid 5 has a flat upper face 8 which serves as a table face. In addition, the lid 5 is configured to cover the receptor space 60 of the box body 2A-1.

The lid 5 has a front end part 5A which is provided with a rotary part 9 (otherwise referred to as guide) having a certain thickness and shaped substantially rectangular. The rotary part 9 is supported to the lid 5 in such a manner as to rotate in a horizontal direction about a vertical shaft 10 (see FIG. 6).

Figure 6:
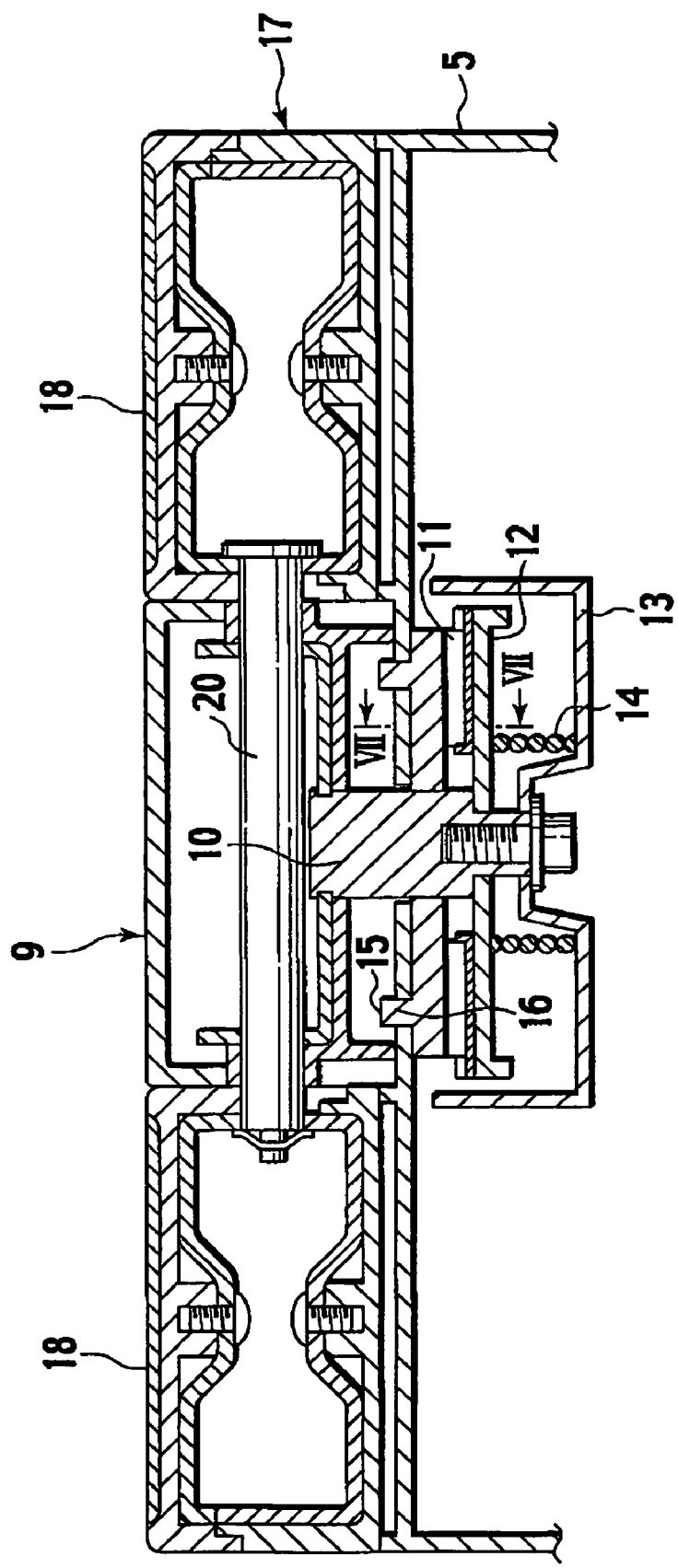
FIG. 6 is a cross sectional view taken along the lines VI-VI in FIG. 2.
Figure 7:
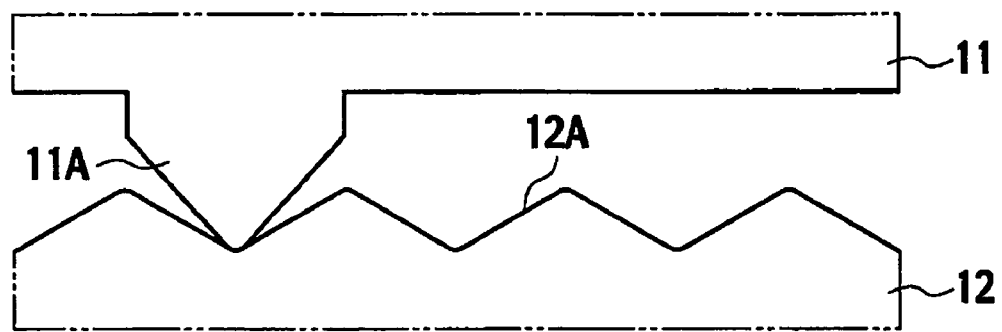
FIG. 7 is a cross sectional view taken along the lines VII-VII in FIG. 6.
Figure 8:
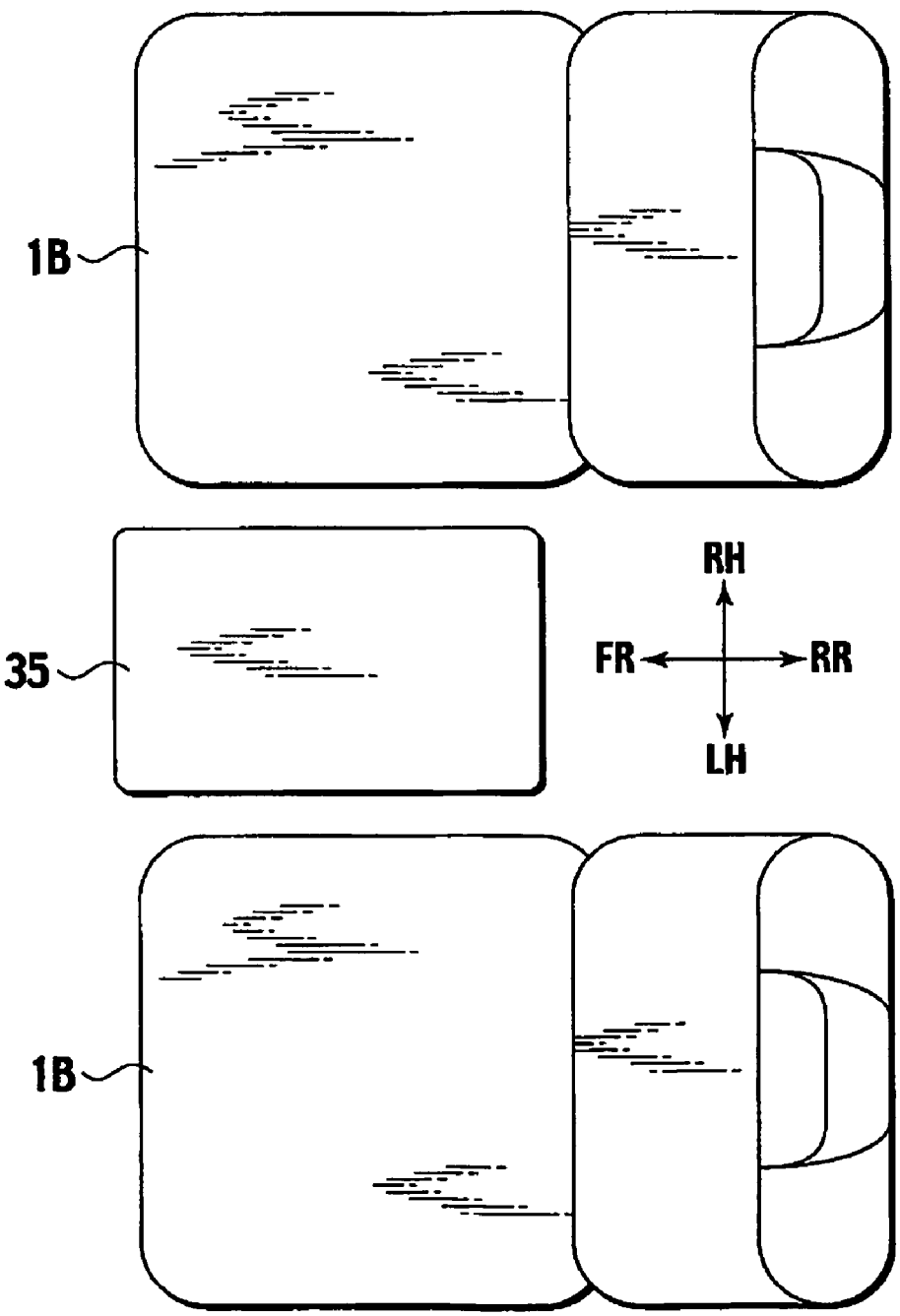
FIG. 8 is a plan view showing a console box, according to a second embodiment of the present invention.

As shown in FIG. 6, in a lower part of the vertical shaft 10, there are provided a circular clutch base 11 and a circular clutch plate 12 below the circular clutch base 11, in addition, at a lower end of the vertical shaft 10, there is provided a large washer 13. Between the large washer 13 and the clutch plate 12, there is provided a spring 14 for biasing the clutch plate 12 upward. As shown in FIG. 7, an upper face of the clutch plate 12 is a convex-concave 12A in a form of a wave in a circumferential direction, while a lower face of the clutch base 11 is formed with a protrusion 11A engageable with the convex-concave 12A. The clutch plate 12 rotates in combination with the vertical shaft 10, while the clutch base 11 having a key 15 engaged with a hole 16 of the lid 5 is not rotatable. The protrusion 11A engaged with the convex-concave 12A by a certain bias force can apply a frictional force in a horizontal rotary direction. In a nutshell, the clutch plate 12, the clutch base 11 and the spring 14 in combination make a structure of a frictional force applier.

As shown in FIG. 1 and FIG. 6, a table 17 having a plate face 17B overlaps an upper part of the lid 5. On an upper face of the table 17, there is provided a slide-proof seat 18. The table 17 and the rotary part 9 are substantially the same with each other in thickness, forming a common upper face. In a front end part 17A of the table 17, there is formed a cutout 19 corresponding to the rotary part 9 to be positioned in the cutout 19.

A horizontal shaft 20 passing through the rotary part 9 in the horizontal direction connects the table 17's two front end parts 17A which correspond to two sides of the cutout 19. Thereby, the table 17 is rotatable upward about the horizontal shaft 20.

<Operation>

Hereinafter described are operations of the table 17 of the console box 2A, according to the first embodiment of the present invention.

Figure 2:
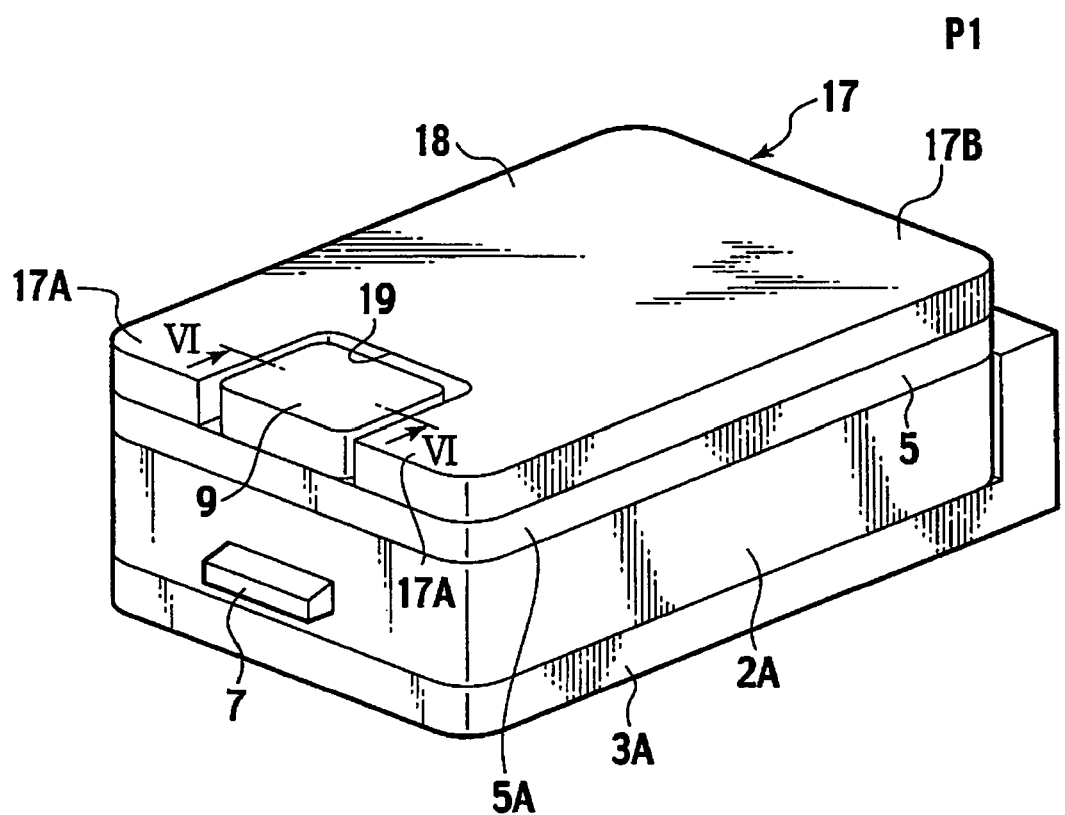
FIG. 2 is a perspective view showing a basic state where the table overlaps a lid.

With the table 17 in a state of being put next to the front seat 1A (basic state), an article can be put on the table 17 which is positioned uppermost, as shown in FIG. 2 where the table 17 is in a first position P1. With the rotary part 9 and the table 17 forming the common upper face in combination (in other words, the rotary part 9 serving as a part of the table 17), the article can be put on a region from the rotary part 9 to the table 17. Being disposed on the lid 5, the table 17 is usable with a height as it is, keeping high rigidity of the table 17.

Figure 3:
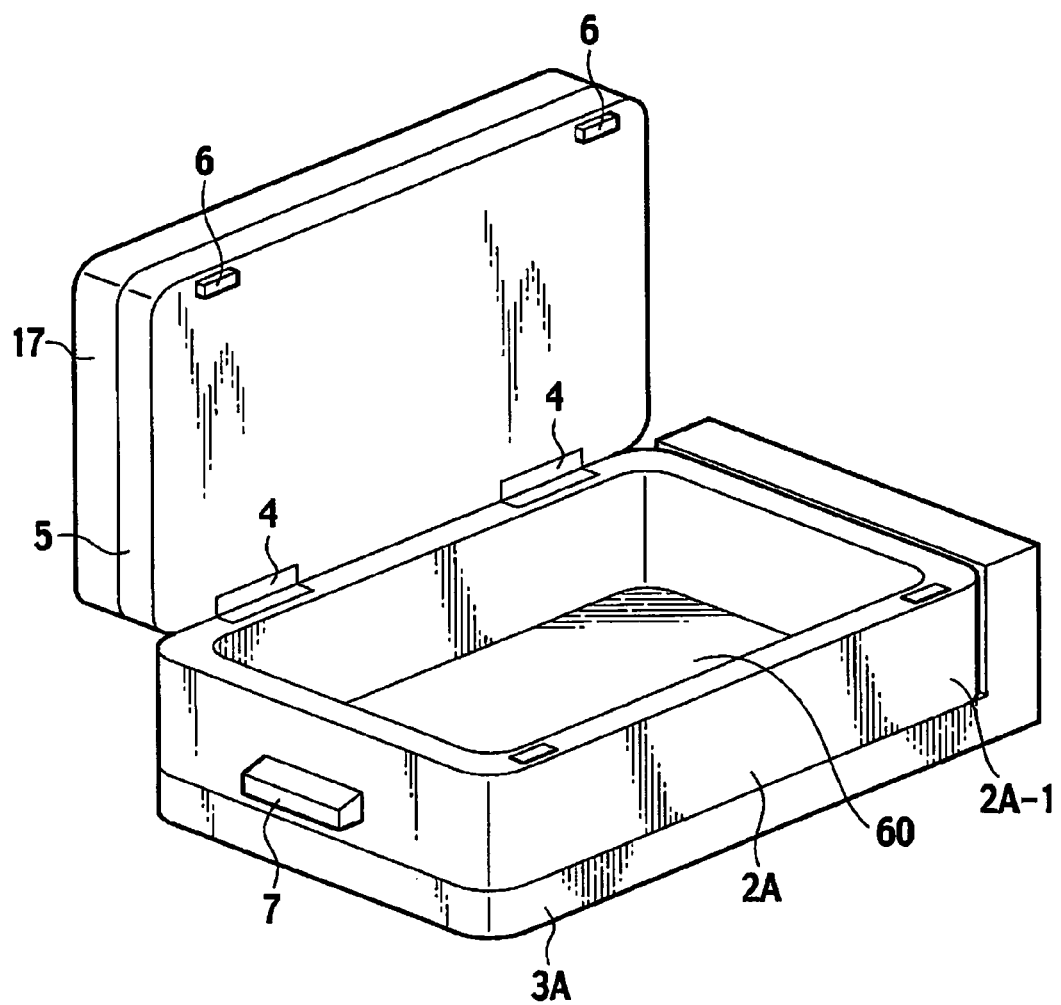
FIG. 3 is a perspective view showing an open state where the lid is opened in combination with the table.

For putting the article in the console box 2A or talking out the article from the console box 2A in the above state, as shown in FIG. 3, the lid 5 in combination with the table 17 is to be moved to an open state of the table 17.

Figure 4:
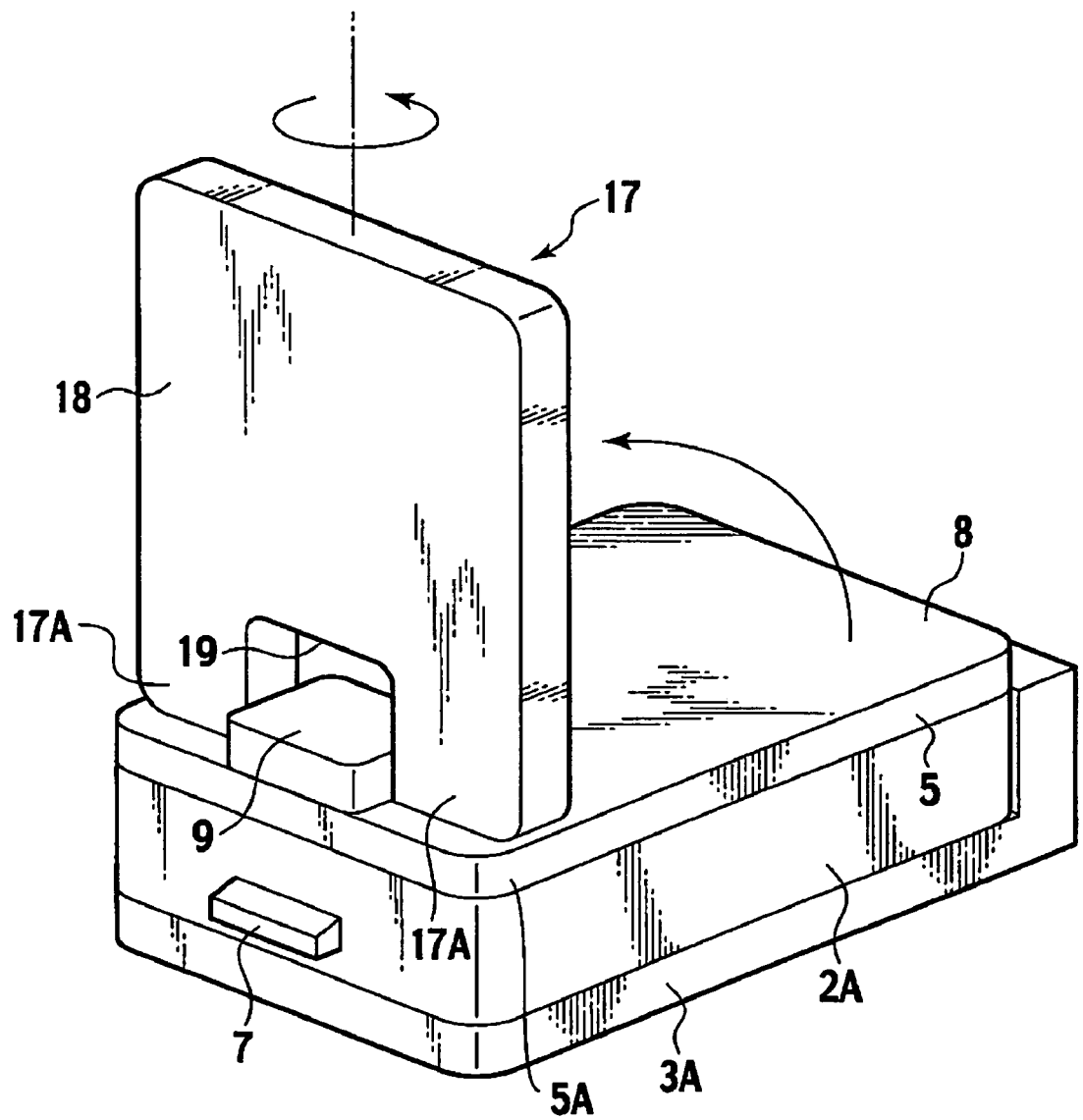
FIG. 4 is a perspective view showing a state where the table is pulled up frontward.
Figure 5:
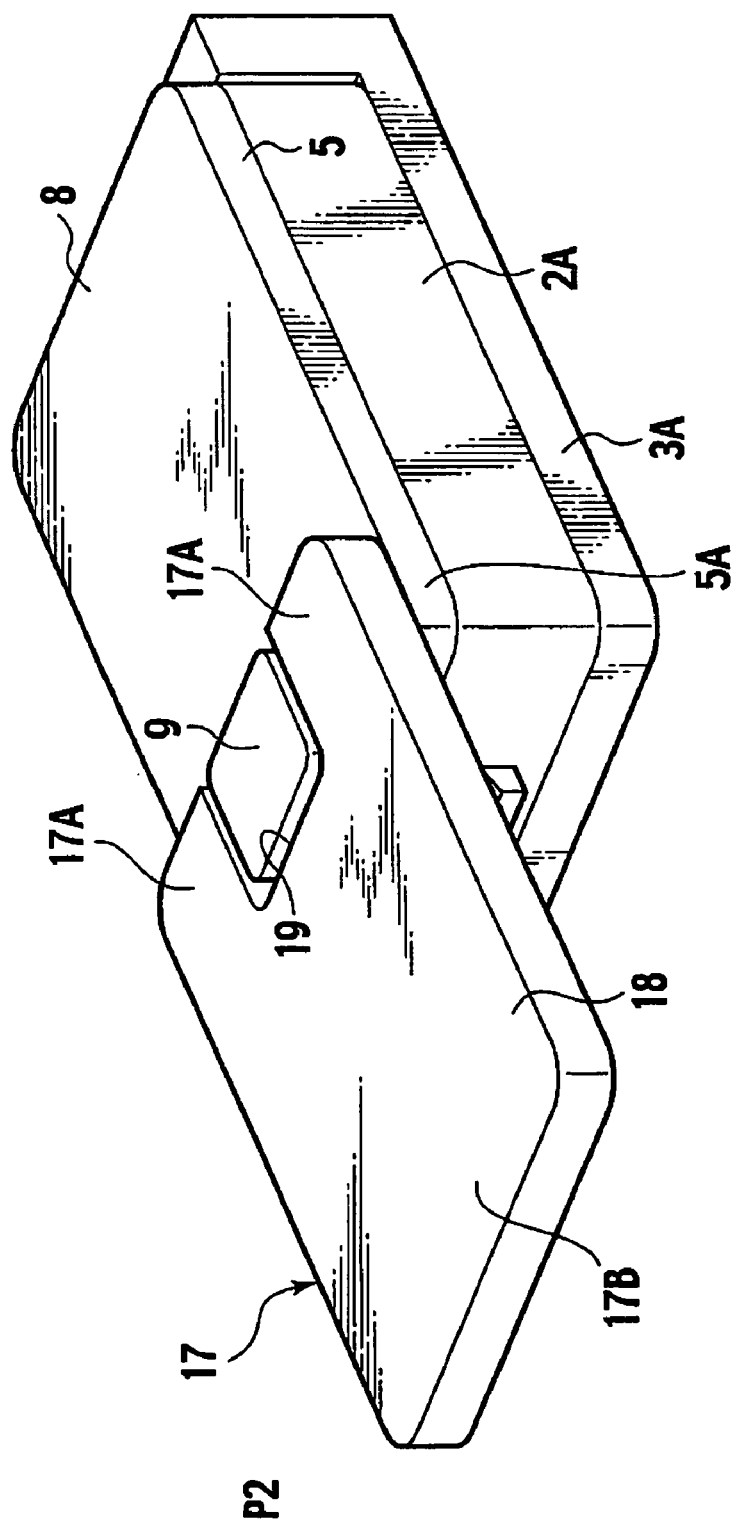
FIG. 5 is a perspective view showing a state where the table is turned frontward.

Then, moving the table 17 to a front part of the seat occupant is to be described. At first, as shown in FIG. 4, the table 17 is to be pulled up frontward about the horizontal shaft 20 (see FIG. 6) passing through the rotary part 9. Then, the rotary part 9 in combination with the table 17 is to be rotated by 180° to be falling down frontward. Then, as shown in FIG. 5, the table 17 is in a frontward state (second position P2) with the upper face thereof (having the slide-proof seat 18) turning upward. As a result, the table 17 is moved to the frontward state by being pulled up, causing no interference with the seat occupant on the front seat 1A, bringing about a preferable operability.

After the table 17 being in the frontward state, as shown in FIG. 1, the table 17 is to be horizontally rotated about the rotary part 9 in a preferable direction by a preferable angle. The table 17 after being rotated to an arbitrary position can be kept there by means of the clutch plate 12 and the clutch base 11 in combination applying the frictional force to the vertical shaft 10 of the rotary part 9, thus making the table 17 useful. Moreover, in the frontward state of the table 17 in FIG. 5, the table 17 can be used with the height as it is, keeping as high rigidity of the console box 2A as in the basic state in FIG. 2. Moreover, in the frontward state in FIG. 5, the rotary part 9 and the table 17 have the common upper face, putting the article on the region from the table 17 to the rotary part 9, like in FIG. 2.

In addition, the lid 5's flat upper face 8 exposed by moving the table 17 frontward serves as a table face, thereby putting the article on the lid 5's flat upper face 8, resulting in an increased usable area of the table 17.

Second Embodiment

<Structure>

FIG. 8 to FIG. 25 show a console box 2B, according to a second embodiment of the present invention. Between a right front seat 1B and a left front seat 1B of the automobile, there is provided the console box 2B. The console box 2B is in a form of a vessel having an opening in an upper part thereof, and is disposed on an upper part of a floor tunnel (not shown) via a base 3B. In addition, the console box 2B includes a box body 2B-1 having the receptor space 60 (not shown in FIG. 8 to FIG. 25 though) like the one shown in FIG. 3 according to the first embodiment.

In the upper part of the console box 2B according to the second embodiment, there is provided a lid 30 opening and closing in a lateral direction about binges (not shown in FIG. 9) at a right end of the console box 2B, in substantially the same manner as that of the lid 5 in FIG. 3 according to the first embodiment. The lid 30 has a flat upper face which serves as a table face.

Figure 11:
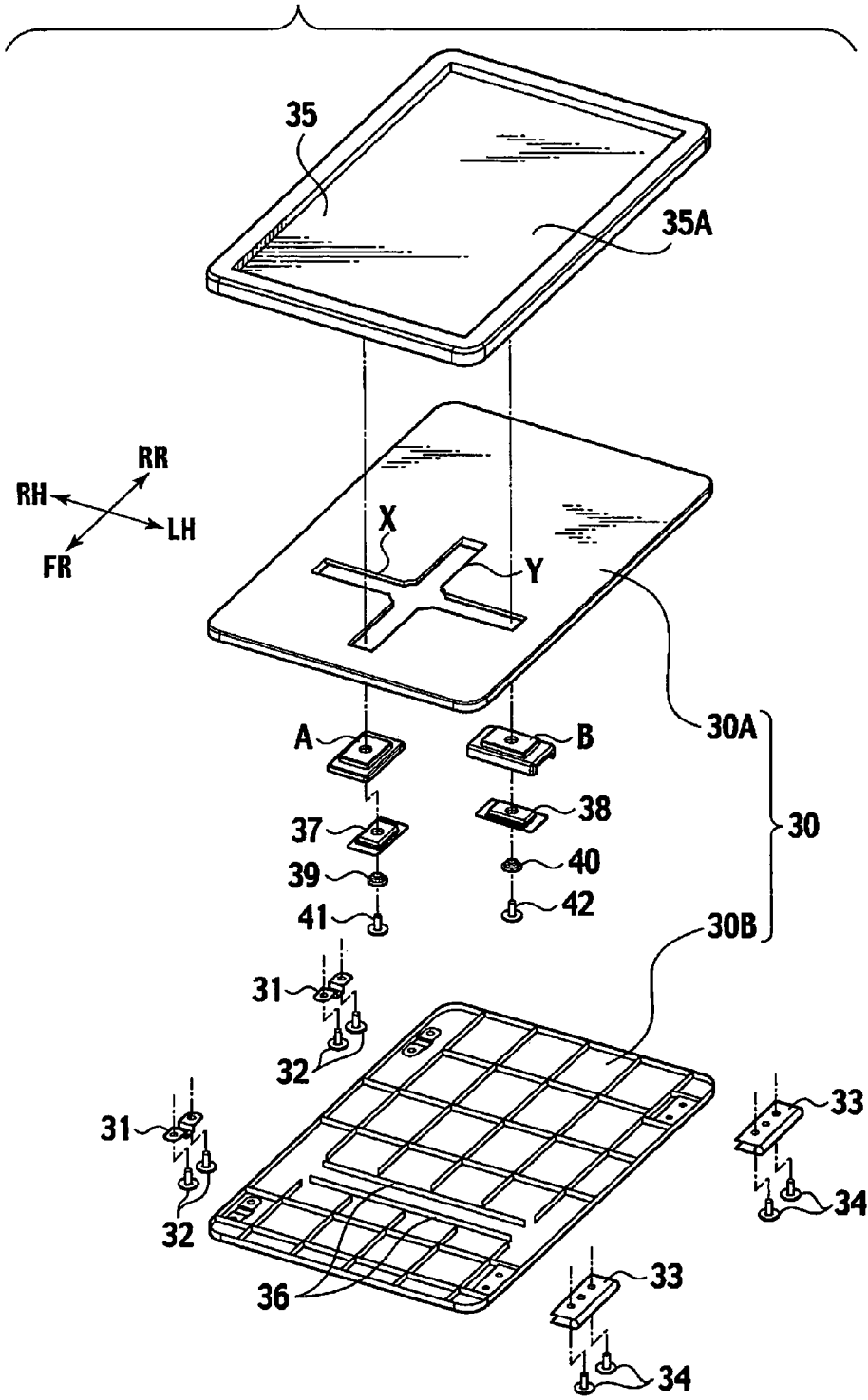
FIG. 11 an exploded perspective view of the table in FIG. 9 and FIG. 10.
Figure 12:
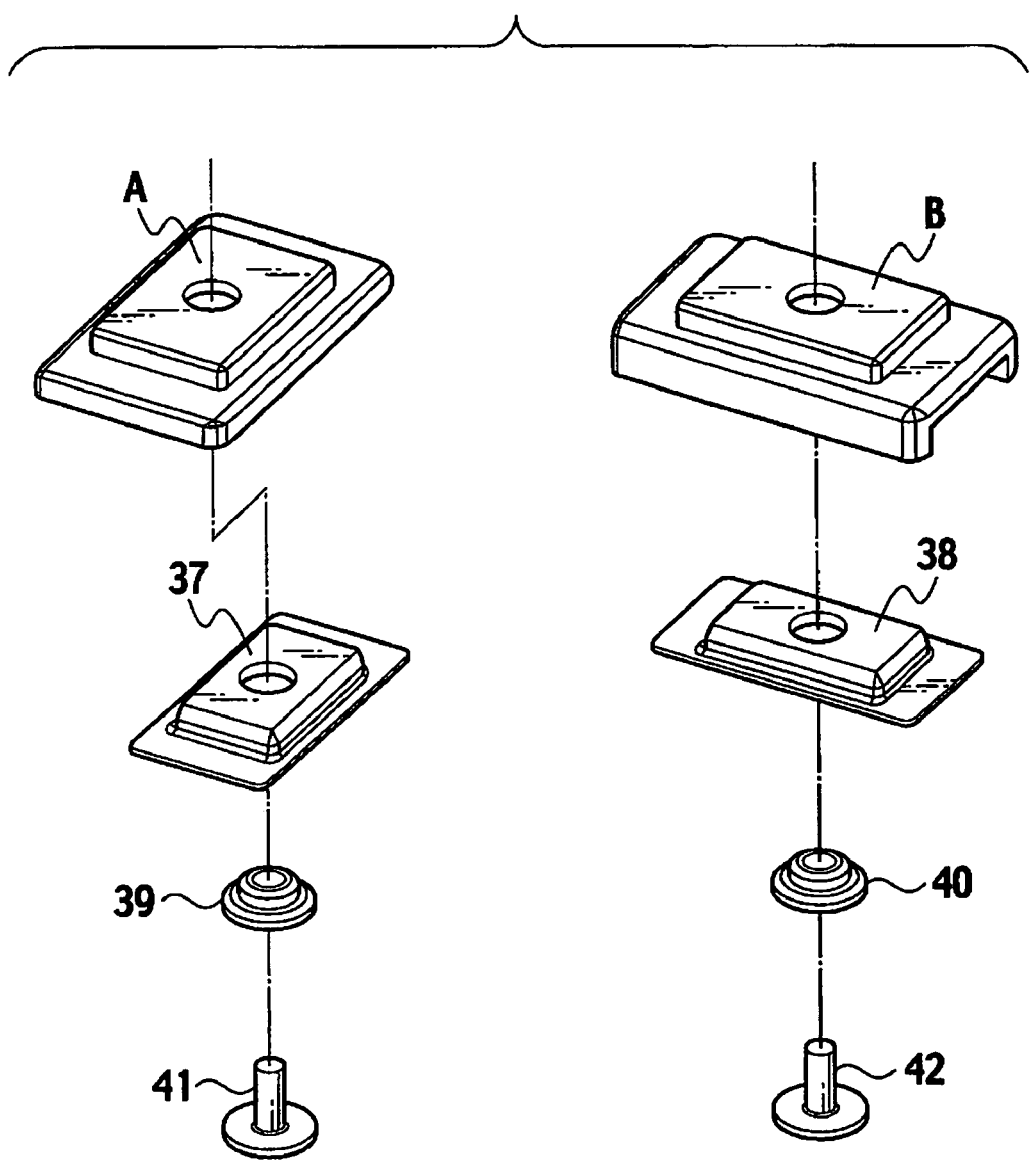
FIG. 12 is an exploded perspective view of a first slider and a second slider in FIG. 11.

As shown in FIG. 11, the lid 30 includes an upper lid 30A and a lower lid 30B. The upper lid 30A and the lower lid 30B are united by means of two brackets 31, four pins 32, two clips 33 and four pins 34. In a slightly frontward FR position in a widthwise center thereof in FIG. 11, the upper lid 30A is formed with a first slide slit Y (extending frontward FR to rearward RR) and a second slide slit X (extending rightward RH to leftward LH), intersecting substantially perpendicular to each other.

Figure 9:
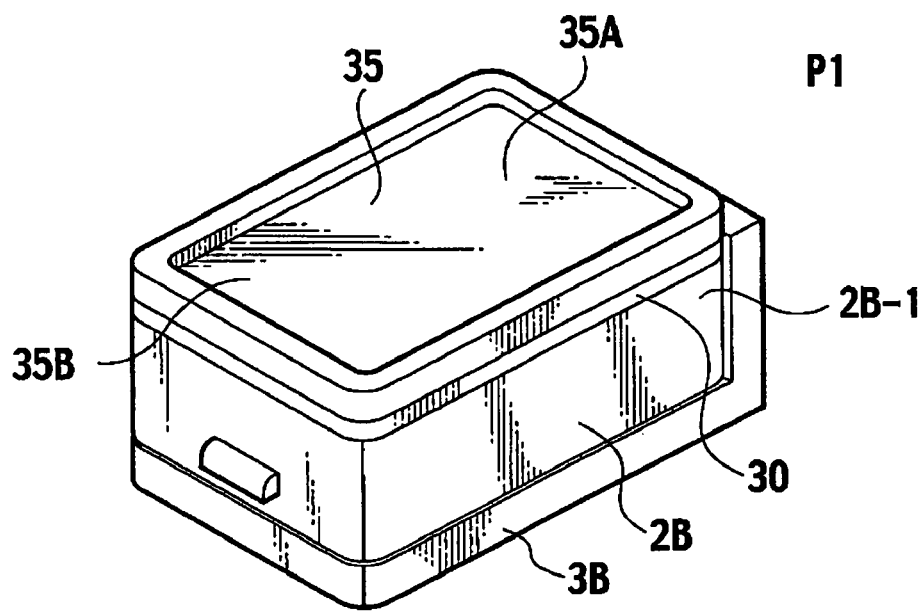
FIG. 9 is a perspective view of the console box, showing the table in a basic state.
Figure 10:
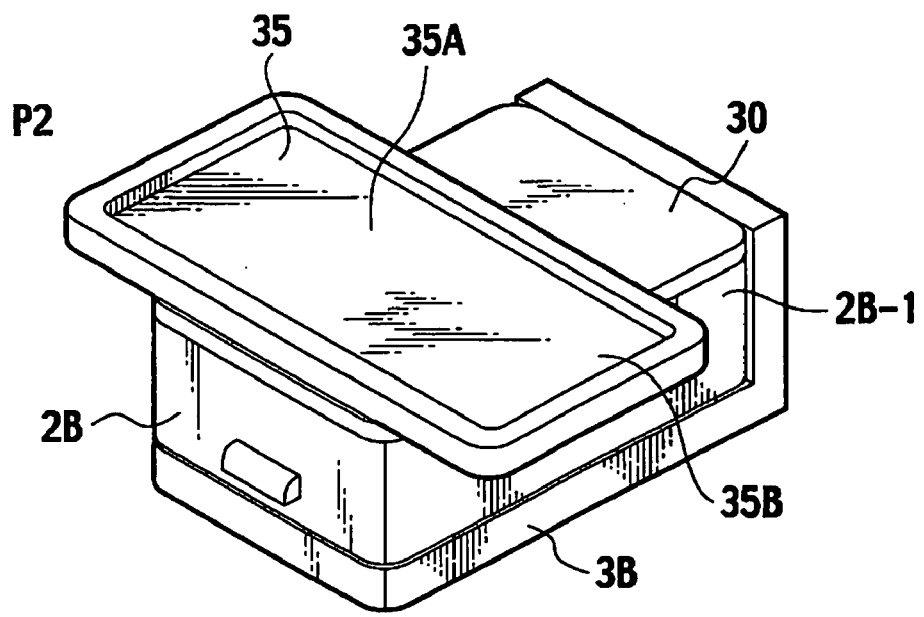
FIG. 10 is a perspective view of the console box, showing the table in FIG. 9 rotated frontward.
Figure 14:
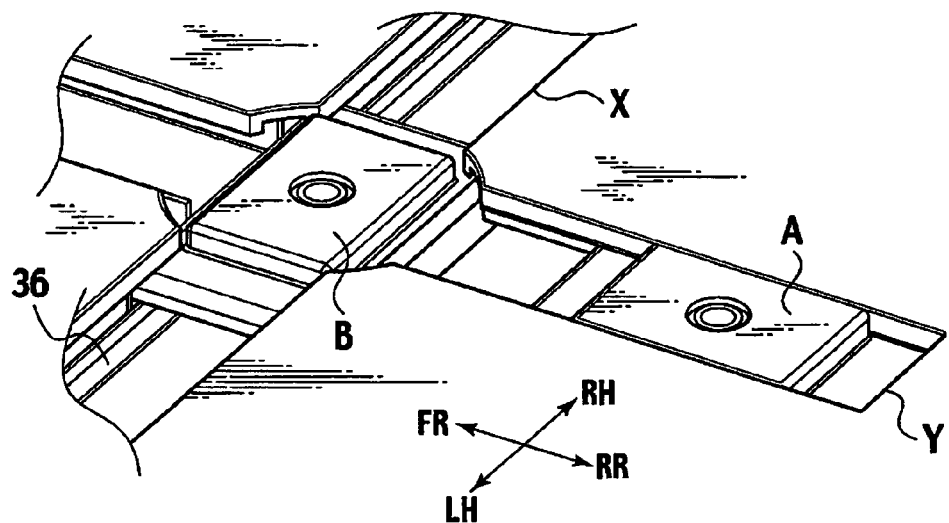
FIG. 14 is a perspective view showing the first slider and the second slider, respectively, in a first slide slit and a second slide slit.
Figure 15:
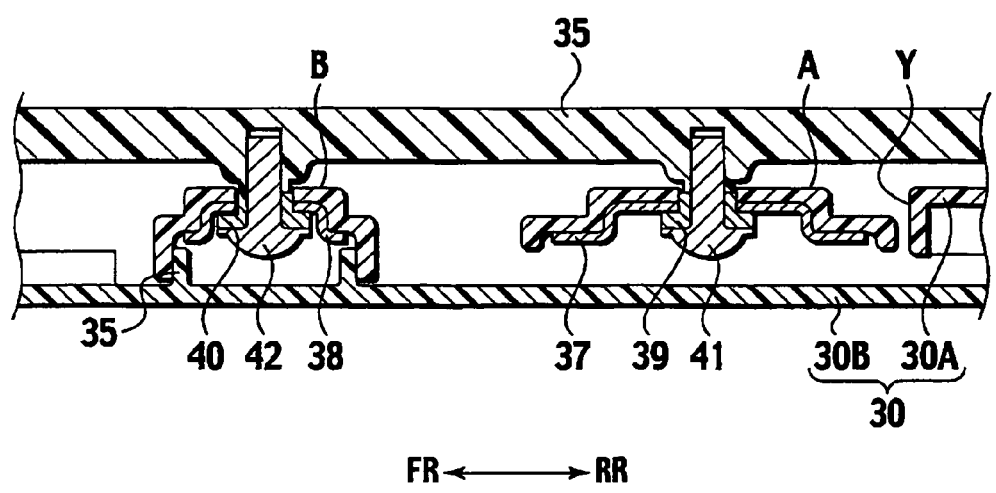
FIG. 15 is a cross sectional view taken along the lines XV-XV in FIG. 13.
Figure 16:
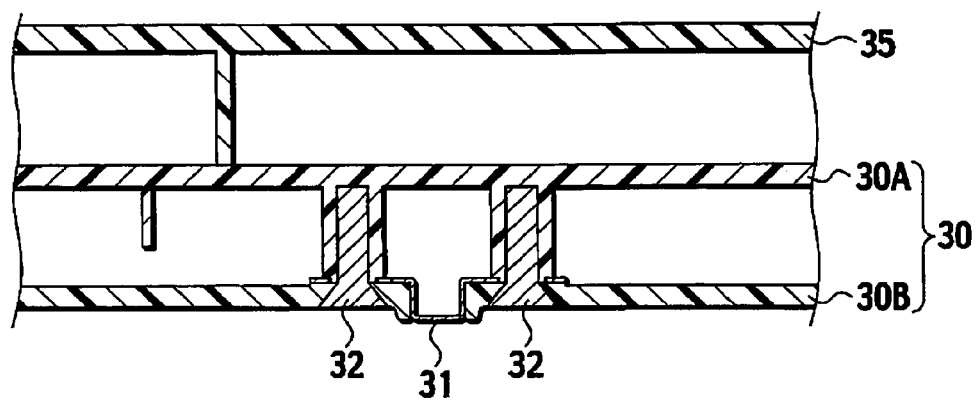
FIG. 16 is a cross sectional view taken along the lines XVI-XVI in FIG. 13.
Figure 17:
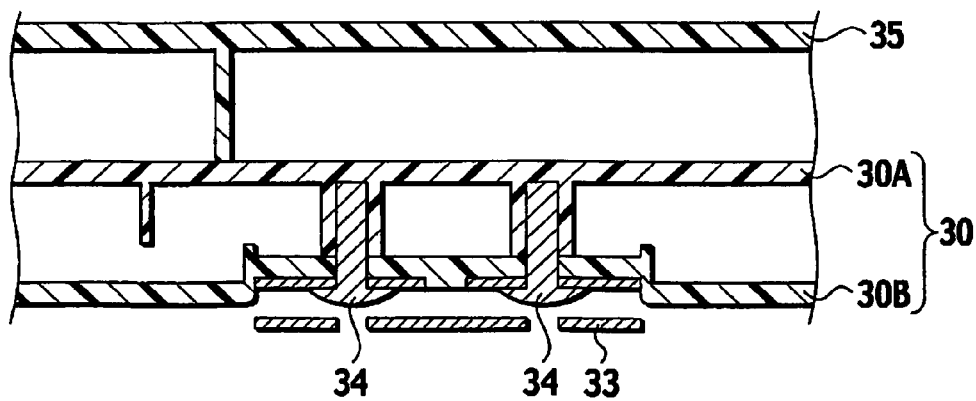
FIG. 17 is a cross sectional view taken along the lines XVII-XVII in FIG. 13.

A table 35 having a profile substantially the same as that of the lid 30 overlaps an upper part of the lid 30. In FIG. 9, the table 35 having a plate face 35B is in the first position P1 where the box body 2B-1 is overlapped with the lid 30, while in FIG. 10, the table 35 is in the second position P2 which is disposed frontward FR relative to the first position P1 with respect to the front seat 1B. As shown in FIG. 14 in combination with FIG. 11, in a first position (of the table 35) corresponding to the intersection of the first slide slit Y and the second slide slit X of the upper lid 30A, there is provided a second slider B. In a position (of the table 35) rearward RR of the first position, there is provided a first slider A. The first slider A is movable along the first slide slit Y in the frontward FR and rearward RR direction, while the second slider B is movable along the second slide slit X in the leftward LH and rightward RH direction. A rail 36 is disposed on the lower lid 30B and extends in the leftward LH and rightward RH direction. Being engaged with the rail 36, the second slider B does not deviate from the second slide slit X.

The first slider A and the second slider B are each made of resin, with lower sides thereof provided respectively with a metal slider body 37 and a metal slider body 38. With this, the first slider A and the second slider B are fitted to the table 35 from a lower side of the table 35 in such a manner as to rotate by means of a pin 41 (otherwise referred to as shaft) and a pin 42 (otherwise referred to as shaft) via a bush 39 and a bush 40, respectively. The first slider A and the second slider B each have a cross section in a form of a hat. The first slider A and the second slider B have circumferential parts thereof engaged with edge parts of the respective first slide slit Y and second slide slit X from lower side, thereby being fixed to the lid 30. Moreover, the first slider A and the second slider B have center parts thereof engaged with inner parts of the respective first slide slit Y and second slide slit X, thereby moving along the first slide slit Y and the second slide slit X respectively. According to the second embodiment, the first slider A in combination with the second slider B and the first slide slit Y in combination with the second slide slit X form a couple mechanism (otherwise referred to as guide).

<Operation>

According to the second embodiment, movement of the first slider A and the second slider B (in the respective first slide slit Y and second slide slit X of the lid 30) which are rotatably fitted to the table 35 can move the table 35 in the frontward FR and rearward RR direction with the first slider A horizontally rotated as a rotary center.

Figure 19:
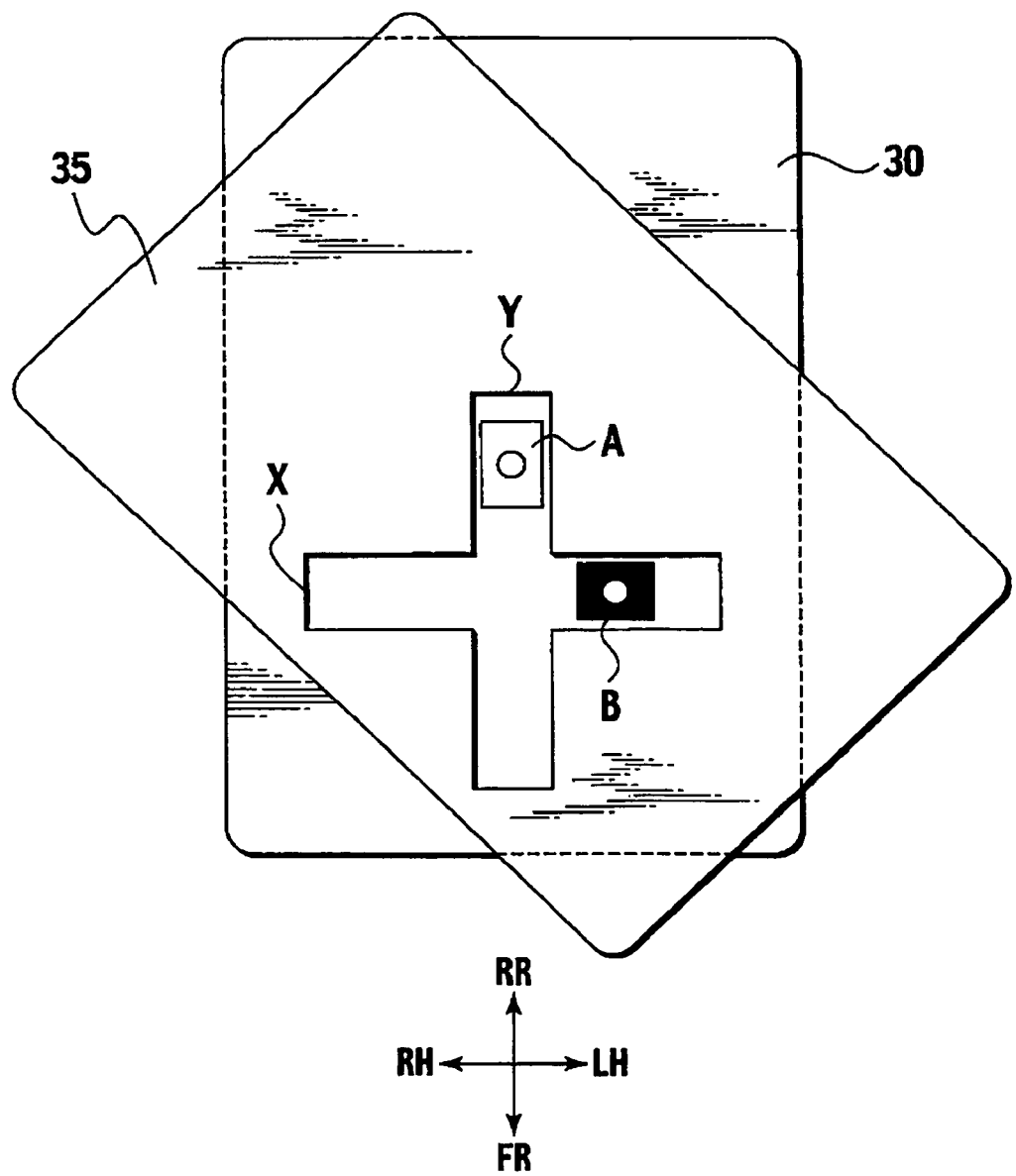
FIG. 19 is a plan view of the table in a state of 45° rotation.

Specifically, from a basic state in FIG. 18, slightly moving the first slider A to the frontward FR by slightly moving the second slider B to the leftward LH will move the entirety of the table 35 leftward LH by 45° about the first slider A which is disposed in the leftward LH and rightward RH center in an inner area 35A of the table 35 (refer to FIG. 19).

In addition, moving the first slider A to the intersection of the first slide slit Y and the second slide slit X by further moving the second slider B to the leftward LH will rotate the table 35 by 90° to the leftward LH (refer to FIG. 20). The lid 30's upper face exposed on the rearward RR of the table 35 is also usable as a table face.

Figure 21:
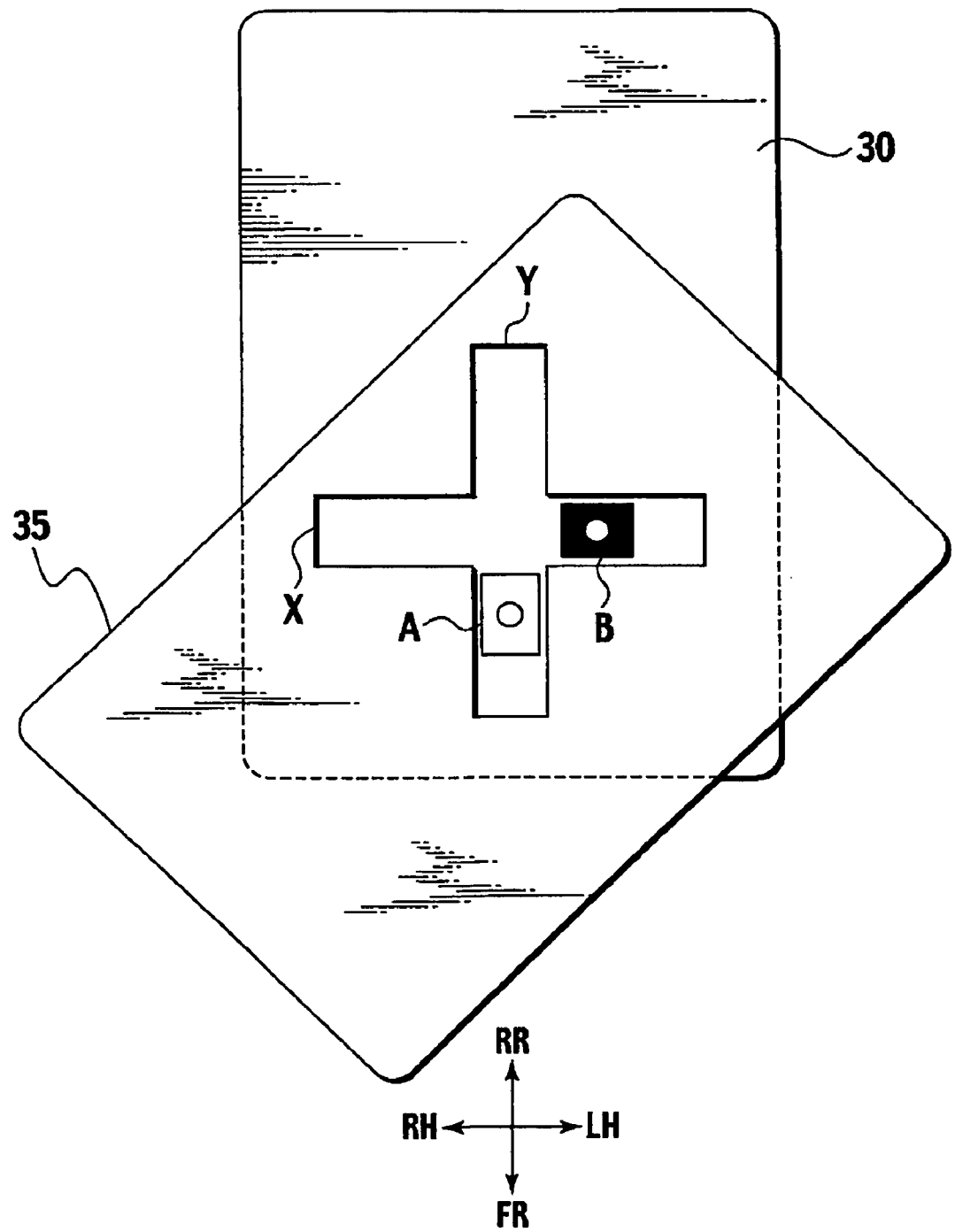
FIG. 21 is a plan view of the table in a state of 135° rotation.

From the above state in FIG. 20, slightly moving the second slider B to the leftward LH by slightly moving the first slider A to the frontward FR will rotate the table 35 by 135° to the leftward LH (counterclockwise) from the basic state (refer to FIG. 21).

Figure 22:
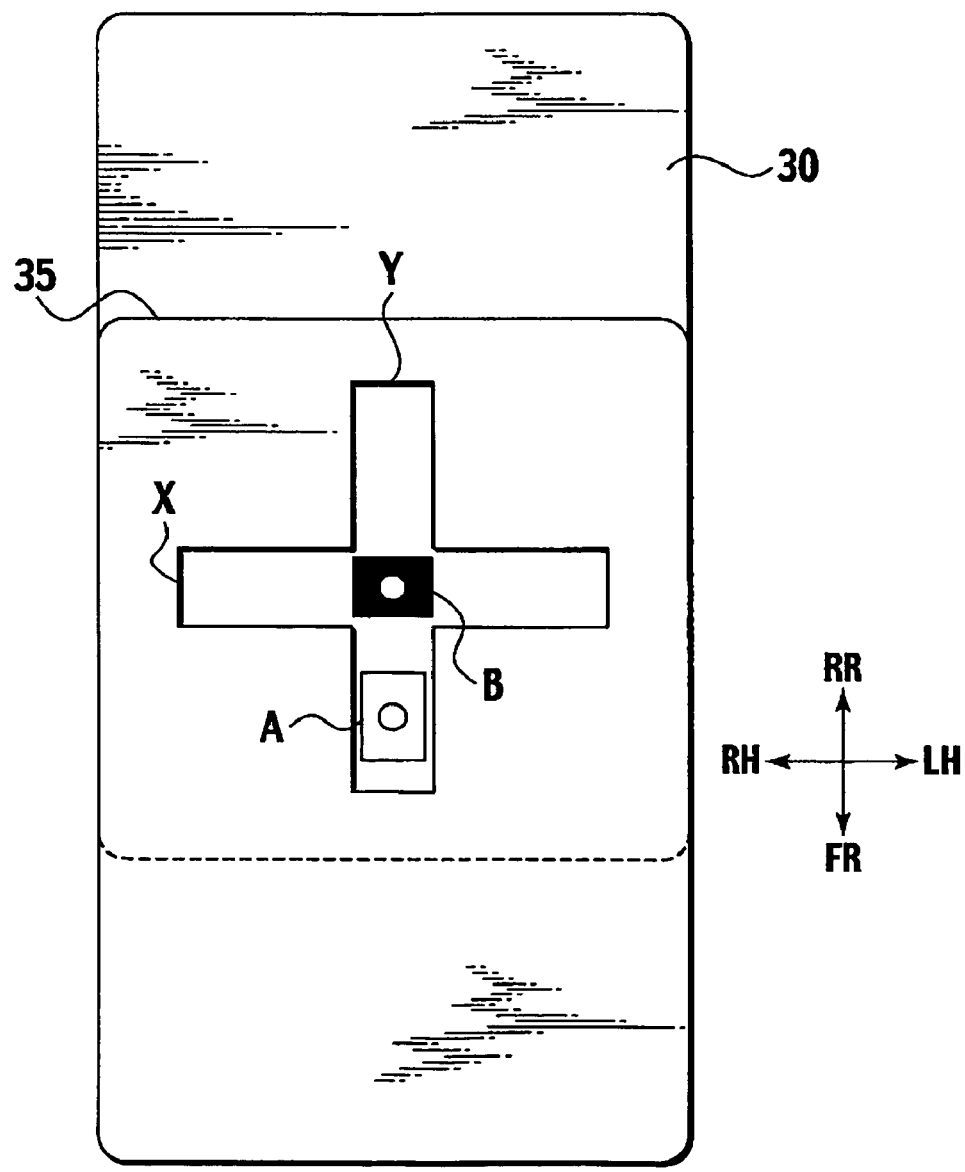
FIG. 22 is a plan view of the table in a state of 180° rotation.

From the above state in FIG. 21, positioning the second slider B in the intersection of the first slide slit Y and the second slide slit X by further moving the first slider A to the frontward FR of the first slide slit Y will rotate the table 35 by just 180°, thereby the table 35 protruding to the frontward FR as a whole (refer to FIG. 22).

Figure 23:
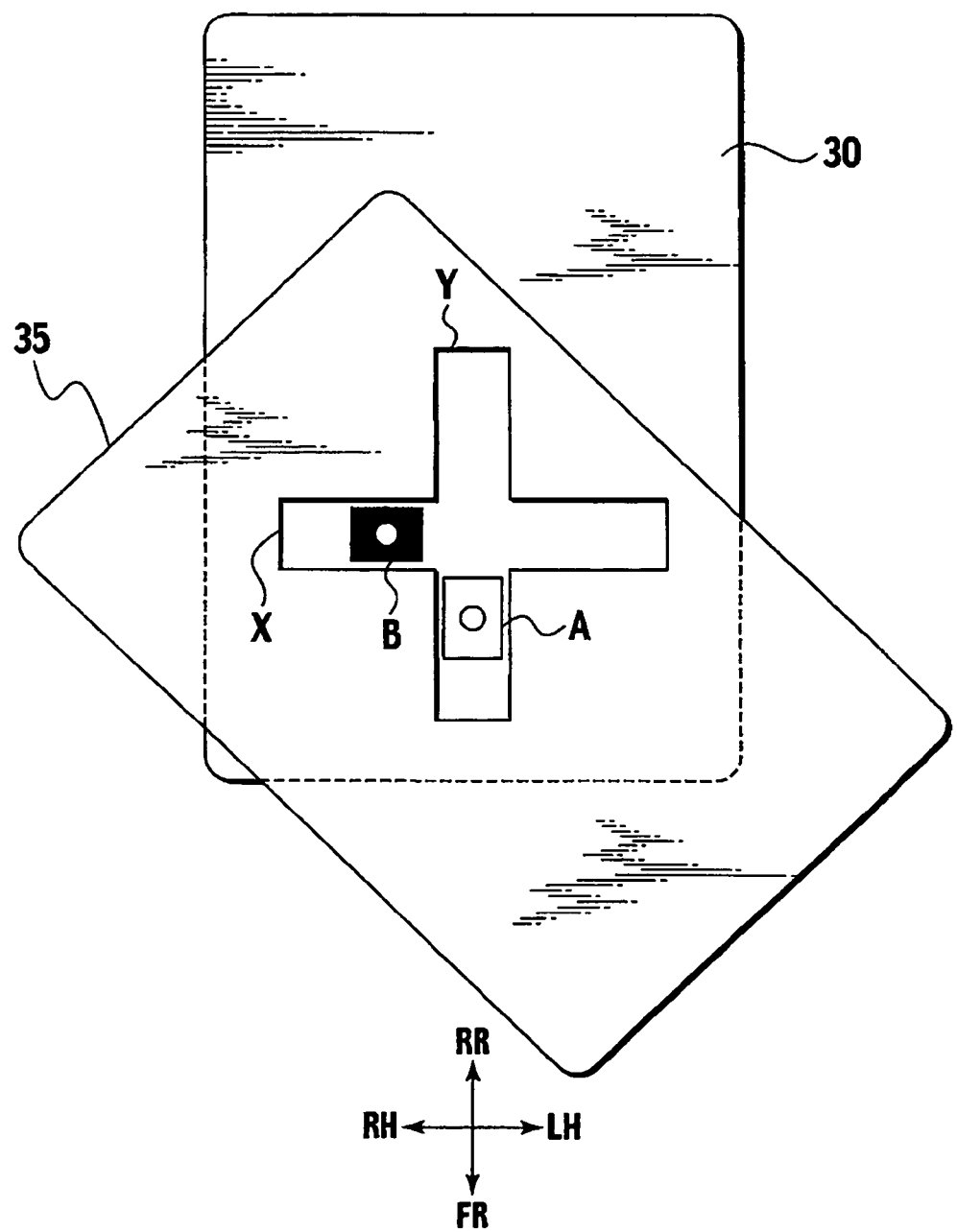
FIG. 23 is a plan view of the table in a state of 225° rotation.

From the above state in FIG. 22, slightly moving the first slider A to the rearward RR by slightly moving the second slider B to the rightward RH will rotate the table 35 by 225° from the basic state (refer to FIG. 23).

From the above state in FIG. 23, positioning the first slider A in the intersection of the first slide slit Y and the second slide slit X by further moving the second slider B to the rightward RH of the second slide slit X will rotate the table 35 by 270° from the basic state (refer to FIG. 24).

Figure 25:
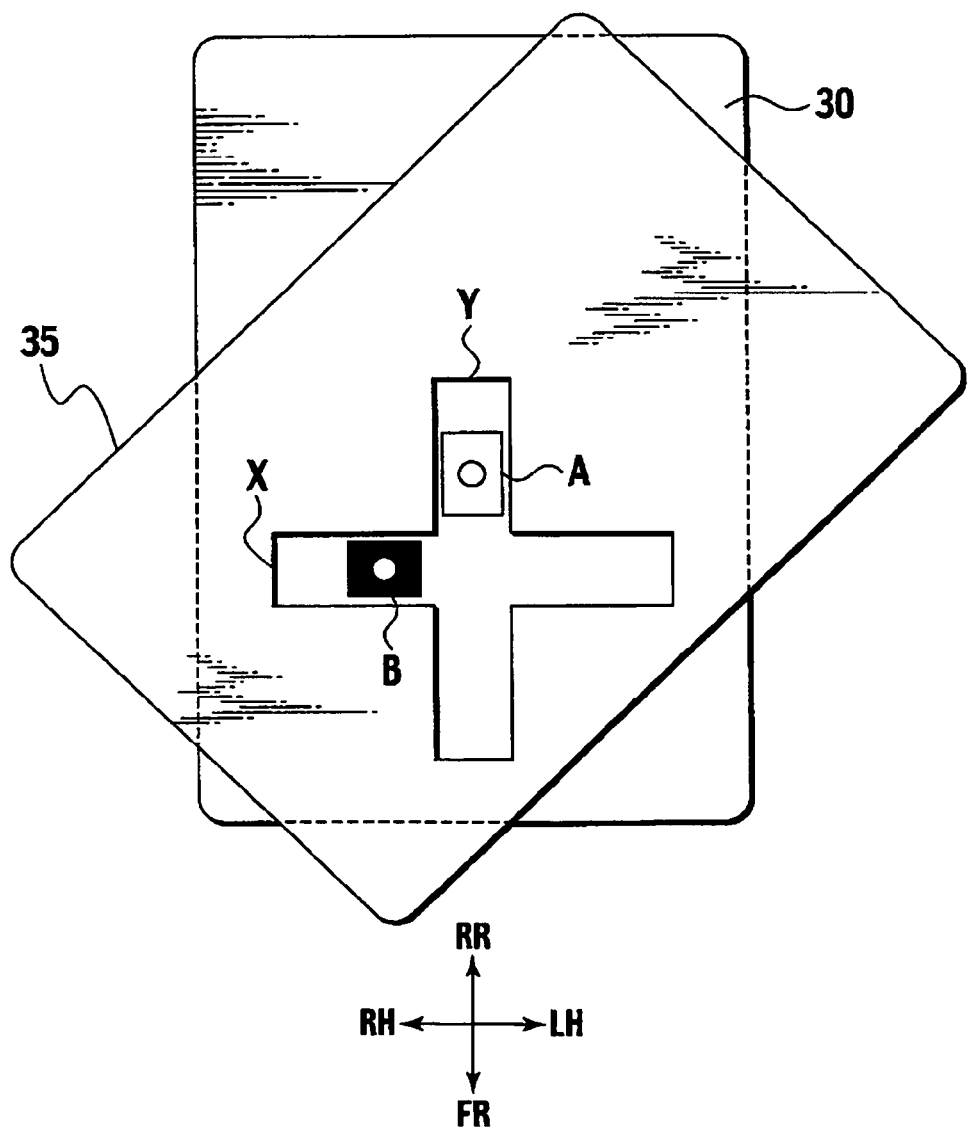
FIG. 25 is a plan view of the table in a state of 315° rotation.

From the above state in FIG. 24, slightly moving the second slider B to the leftward LH by slightly moving the first slider A to the rearward RR will rotate the table 35 by 315° from basic state (refer to FIG. 25).

Finally, from the above state in FIG. 25, moving the second slider B to the intersection of the first slide slit Y and the second slide slit X by further moving the first slider A to the rearward RR will return the table 35 to the basic state in FIG. 18. The table 35 is positioned most frontward by 180° rotation as shown in FIG. 22, and most rearward in the basic state as shown in FIG. 18. The above operation of the table 35 is a rotation from the rightward RH to the leftward LH (counterclockwise). According to the second embodiment, however, an opposite rotation from the leftward LH to the rightward RH (clockwise) is also allowed.

According to the second embodiment, the table 35 moves in the frontward FR and rearward RR direction by making a horizontal rotation about the first slider A (rotary center) in the inner area 35A of the table 35, thus reducing the table 35's protrusion in the leftward LH and rightward RH direction in the rotating of the table 35. Thereby, the table 35 in the rotating does not cause an interfere with the seat occupant, bringing about a preferable operability. In addition, the inner area 35A of the table 35 coupled with the couple mechanism (the first slide slit Y, the second slide slit X, the first slider A, the second slider B) can increase support rigidity the console box 2B when the table 35 is used. In other words, even the lid 30's edge part away from the couple mechanism is supported from the lower side, thus increasing the support rigidity of the console box 2B.

Third Embodiment

<Structure>

Figure 26:
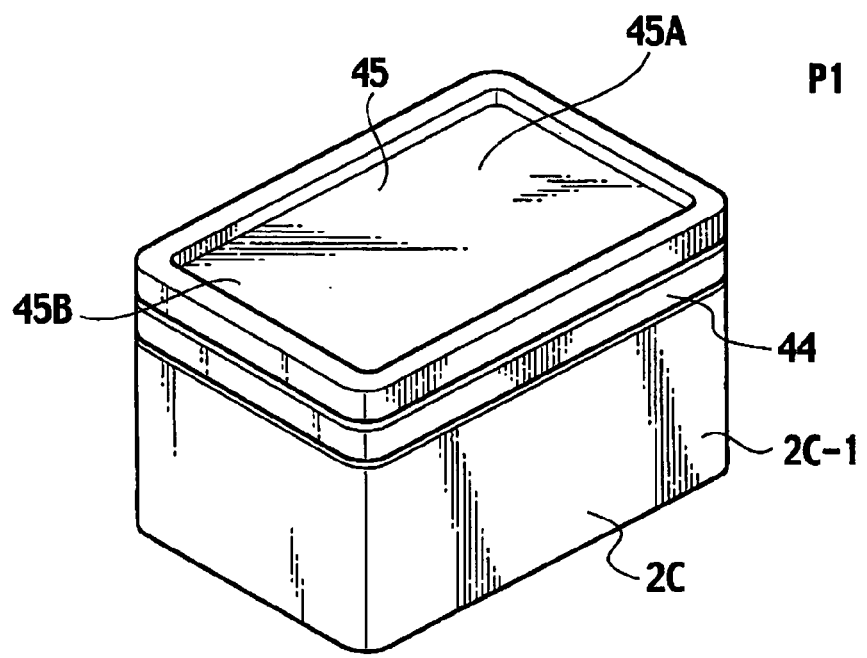
FIG. 26 is a perspective view showing a console box, according to a third embodiment of the present invention.
Figure 27:
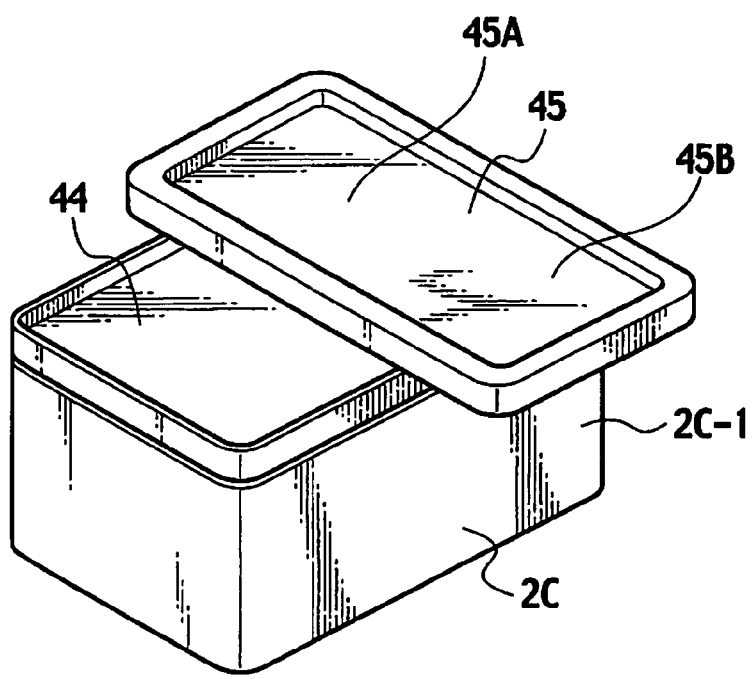
FIG. 27 is a perspective view of the console box with the table rotated rearward.
Figure 28:
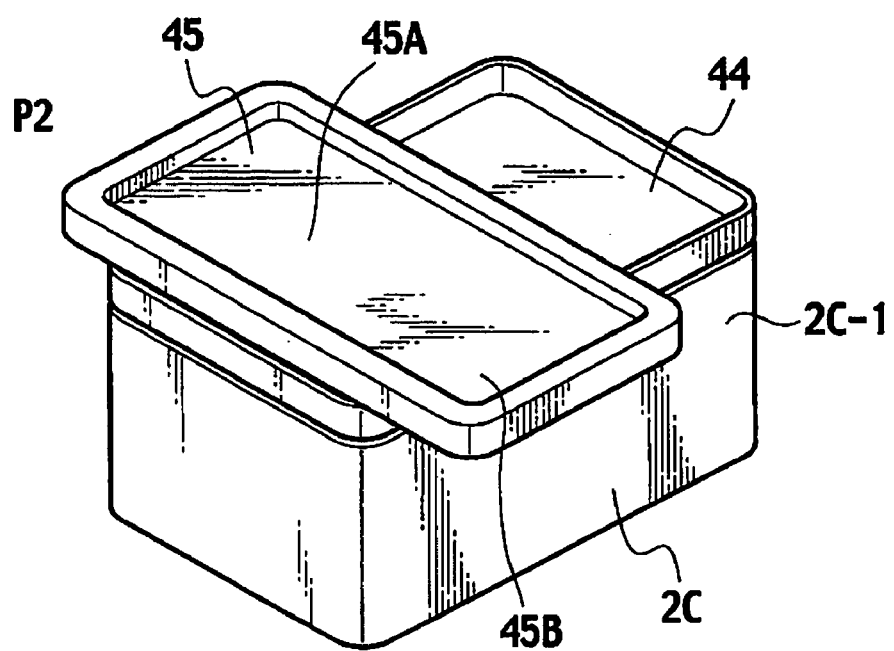
FIG. 28 is a perspective view of the console box, showing the table rotated frontward.

FIG. 26 to FIG. 30 show a console box 2C, according to a third embodiment of the present invention. In the upper part of the console box 2C according to the third embodiment, there is provided a lid 44 opening and closing in a lateral direction about hinges (not shown in FIG. 28), in substantially the same manner as that of the lid 5 in FIG. 3 according to the first embodiment A table 45 is positioned on an upper part of the lid 44. In addition, the console box 2C includes a box body 2C-1 having the receptor space 60 (not shown in FIG. 26 to FIG. 30 though) like the one shown in FIG. 3 according to the first embodiment. In FIG. 26, the table 45 having a plate face 45B is in the first position P1 where the box body 2C-1 is overlapped with the lid 44, while in FIG. 28, the table 45 is in the second position P2 which is disposed frontward FR relative to the first position P1 with respect to the front seat 1B (not shown in FIG. 26 to FIG. 30 though) like the one shown in FIG. 8 according to the second embodiment.

Figure 29:
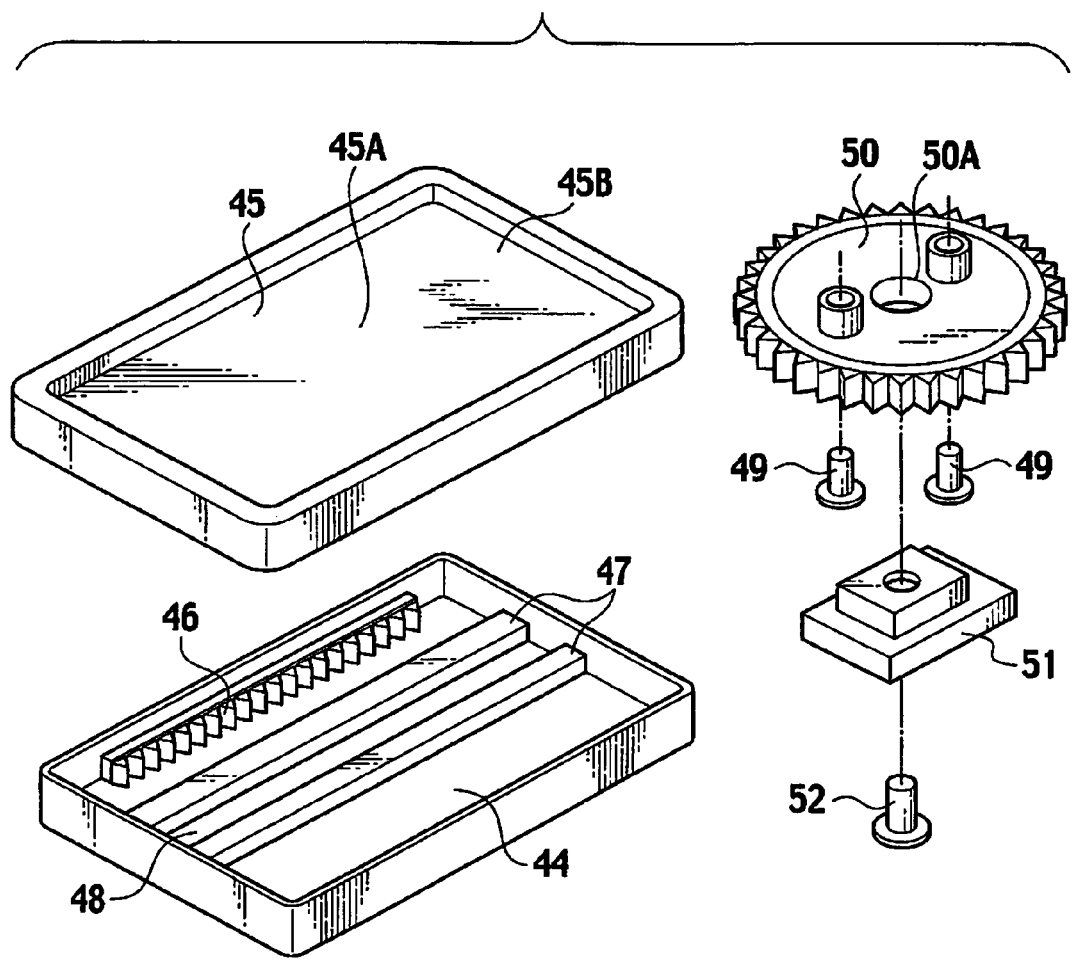
FIG. 29 is an exploded perspective view of a couple mechanism between the table and a lid.
Figure 30:
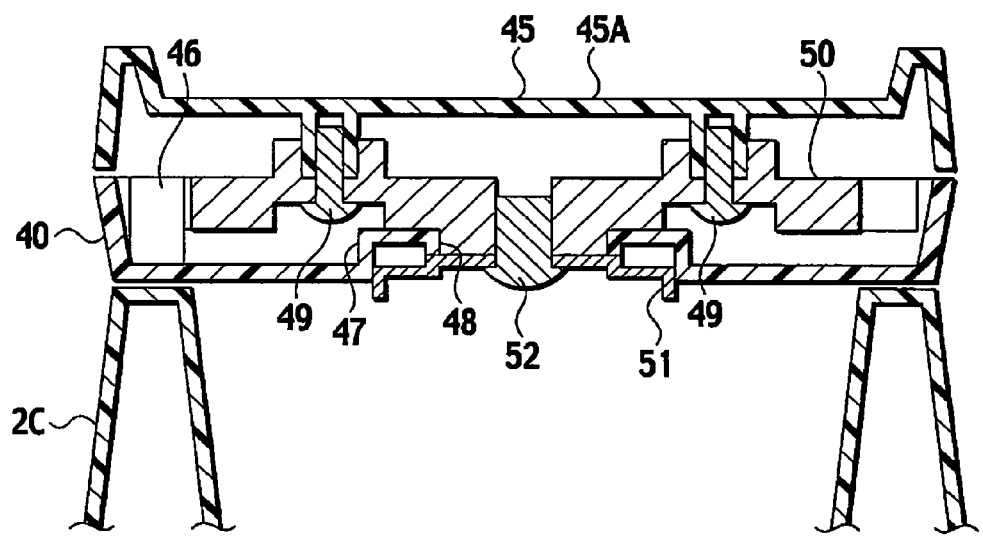
FIG. 30 is a cross sectional view of the couple mechanism between the table and the lid.

As shown in FIG. 29 and FIG. 30, the lid 44 has a right end provided with a rack gear 46 extending in the frontward FR and rearward RR direction. In addition, as shown in FIG. 29, the lid 44 has a center formed with a pair of rails 47 extending in the frontward FR and rearward RR direction. Between the rails 47, there is defined an opening 48. Herein, FIG. 20 and FIG. 21 each omit the disclosure of the rack gear 46, the rails 47 and the like.

In a center position of the inner area 45A of the table 45, there is provided a pinion gear 50 integrated by means of two pins 49 from the lower side. The pinion gear 50 is engageable with the rack gear 46.

Between the rails 47 of the lid 44, a slider 51 is fitted from the lower side in such a manner as to move frontward FR and rearward RR. The slider 51 is fitted to a center part 50A of the pinion gear 50 by means of a pin 52 (otherwise referred to as shaft) passing through from the lower side. The pinion gear 50 is rotatable relative to the slider 51. Thereby, with the pinion gear 50 engaged with the rack gear 46, the table 45 is rotatable about the pin 52. According to the third embodiment, the rack gear 46 and the pinion gear 50 form a "couple mechanism."

<Operation>

According to the third embodiment, moving the table 45 frontward FR and rearward RR allows the pinion gear 50 to rotate in such a manner as to be engaged with the rack gear 46. Thereby, the table 45 moves frontward FR and rearward RR by making a horizontal rotation about the pin 52 through the center part 50A of the pinion gear 50.

Thereby, like the table 35 according to the second embodiment, the table 45 according to the third embodiment in the rotating can reduce the table 45's protrusion in the leftward LH and rightward RH direction, preventing the interfere with the seat occupant, bringing about a preferable operability. In addition, the table 45's inner area 45A coupled with the couple mechanism (especially, the slider 51 in the center of the pinion gear 50) can increase support rigidity of the console box 2C when the table 45 is used.

Although the present invention has been described above by reference to three embodiments, the present invention is not limited to the embodiments described above. Modifications and variations of the embodiments described above will occur to those skilled in the art, in light of the above teachings.

Specifically, according to the first embodiment, only one face of the table 17 is used. However, both faces of the table 17 can be used. In addition, not being flat, the table 17 can be concave and the like as a cup holder.

Moreover, according to the second embodiment, the couple mechanism including the first slider A, the second slider B, the first slide slit Y and the second slide slit X is described, while according to the third embodiment, the couple mechanism including the rack gear 46 and the pinion gear 50 is described. Another type of couple mechanism is applicable provided that the table can be moved frontward and rearward in such a manner as to be horizontally rotated about a rotary shaft of the inner area of the table.

In addition, the exemplified console box is the one used for the automobile. The present invention is, however, not limited to this. The console box may be that of an aircraft or a boat.

This application is based on prior Japanese Patent Application No. P2005-73708 (filed on Mar. 15, 2005 in Japan) and Japanese Patent Application No. P2005-121029 (filed on Apr. 19, 2005 in Japan). The entire contents of the Japanese Patent Application No. P2005-73708 and the Japanese Patent Application No. P2005-121029 from which priorities are claimed are incorporated herein by reference, in order to take some protection against translation errors or omitted portions.

The scope of the present invention is defined with reference to the following claims.

What is claimed is:

1. A console box having a table of a vehicle and disposed between a pair of seats for a passenger, the console box comprising:
   a box body having a receptor space;
   a lid configured to cover the receptor space of the box body; and
   a table configured to move between the followings:
      a first position where the box body is overlapped with the lid, and
      a second position disposed frontward relative to the first position with respect to the seats,
   the table including:
      a shaft configured to support a plate face of the table such that the plate face is rotatable substantially horizontally, and
      a guide configured to move the table frontward through between the pair of the seats, wherein
   the lid is positioned on the console box in such a manner as to open and close, the table being adapted to overlap the lid; and
   the guide which is a rotary part is positioned at a front end part of the lid in such a manner as to rotate substantially horizontally about the shaft, a front end part of the table being fitted to the rotary part in such a manner as to rotate upward and downward about a horizontal shaft passing through the rotary part.

2. The console box as claimed in claim 1, wherein the rotary part and the table are substantially the same in thickness, forming a common upper face.

3. The console box as claimed in claim 1, wherein the lid has an upper face which serves as a table face.

4. The console box as claimed in claim 1, wherein between the rotary part and the lid, a frictional force applier is provided for applying a frictional force for a substantially horizontal rotation.

5. The console box as claimed in claim 4, wherein
   the frictional force applier includes:
      a clutch base in a lower part of the shaft which is substantially vertical,
      a clutch plate below the clutch base, and
      a washer below the clutch plate and at a lower end of the vertical shaft,
   a spring for biasing the clutch plate upward is provided between the washer and the clutch plate,
   an upper face of the clutch plate is a convex-concave in a form of a wave in a circumferential direction, while a lower face of the clutch base is formed with a protrusion engageable with the convex-concave,
   the clutch plate rotates in combination with the vertical shaft, while the clutch base having a key engaged with a hole of the lid is not rotatable, and
   the protrusion engaged with the convex-concave by a certain bias force applies the frictional force in a horizontal rotary direction.

6. The console box as claimed in claim 1, wherein the horizontal shaft passing through the rotary part connects two of the front end parts of the table each of the two corresponding to one of two sides of a cutout of the table, the cutout being formed in the front end part of the table.

7. A console box having a table of a vehicle and disposed between a pair of seats for a passenger, the console box comprising:
   a box body having a receptor space;

a lid configured to cover the receptor space of the box body; and a table configured to move between the followings;
- a first position where the box body is overlapped with the lid, and
- a second position disposed frontward relative to the first position with respect to the seats, the table including:
- a shaft configured to support a plate face of the table such that the plate face is rotatable substantially horizontally, and
- a guide configured to move the table frontward through between the pair of the seats, wherein the guide is configured to move the shaft frontward in such a manner that the shaft is interlocked with a rotation of the table.

8. The console box as claimed in claim 7, wherein the lid is positioned on the console box, the table being adapted to overlap the lid; and the guide which is a couple mechanism couples the table with the lid, the couple mechanism being configured to move the table frontward and rearward by rotating the table substantially horizontally about a rotary center which is provided on an inner area of the table.

9. The console box as claimed in claim 8, wherein the couple mechanism includes:
- a first slide slit extending frontward and rearward and a second slide slit extending leftward and rightward, which are so formed on the lid as to intersect with each other, and
- a first slider and a second slider each fitted to the table in such a manner as to rotate relative to the table, and engageable with the first slide slit and the second slide slit respectively in such a manner as to move therealong.

10. The console box as claimed in claim 9, wherein the lid includes an upper lid and a lower lid which are united by means of a bracket, a first pin, a clip and a second pin, and the first slide slit and the second slide slit are formed on the upper lid.

11. The console box as claimed in claim 8, wherein the couple mechanism includes:
- a rack gear fitted to the lid and extending frontward and rearward, and
- a pinion gear engageable with the rack gear when fixed to the table, having a center part which is supported in such a manner as to rotate relative to the lid, and movable frontward and rearward.

12. The console box as claimed in claim 11, wherein the lid has a first end provided with the rack gear extending frontward and rearward, the lid has a center formed with a pair of rails extending frontward and rearward, and an opening is defined between the rails.

13. The console box as claimed in claim 12, wherein between the rails of the lid, a slider is fitted from a lower side in such a manner as to move frontward and rearward, and the slider is fitted to the center part of the pinion gear by means of a pin passing through from the lower side.

14. The console box as claimed in claim 1, wherein the table is disposed on the lid.

15. The console box as claimed in claim 7, wherein the table is disposed on the lid.

* * * * *